United States Patent [19]
Nakanishi et al.

[11] Patent Number: 6,027,182
[45] Date of Patent: Feb. 22, 2000

[54] BRAKE FORCE CONTROL APPARATUS FOR PROPERLY PERFORMING BOTH AN ABS FUNCTION AND A BA FUNCTION

[75] Inventors: Nobuyasu Nakanishi, Toyota; Akiyoshi Yamada, Toyoake; Satoshi Shimizu, Susono; Hideyuki Aizawa, Susono; Masahiro Hara, Susono, all of Japan

[73] Assignee: Toyota Jidosha Kabushiki Kaisha, Aichi-ken, Japan

[21] Appl. No.: 09/109,771

[22] Filed: Jul. 2, 1998

[30] Foreign Application Priority Data

Jul. 8, 1997 [JP] Japan ..................... 9-182818

[51] Int. Cl.⁷ ...................................... B60T 8/32
[52] U.S. Cl. .................. 303/116.1; 188/356; 303/10; 303/113.4; 303/114.3; 303/115.1; 303/119.1; 303/DIG. 11; 303/113.5; 303/115.4
[58] Field of Search ............... 303/116.1–119.1, 303/10, 13–18, 113.2, 113.3, 155, 115.1–115.6, 113.4, 166, 113.5, 114.3, 114.1, 114.2, DIG. 11, 15; 180/197; 188/358, 359, 356, 357

[56] References Cited

U.S. PATENT DOCUMENTS

| | | |
|---|---|---|
| 5,158,343 | 10/1992 | Reichelt et al. |
| 5,261,730 | 11/1993 | Steiner et al. |
| 5,350,225 | 9/1994 | Steiner et al. |
| 5,367,942 | 11/1994 | Nell et al. |
| 5,427,442 | 6/1995 | Heibel |

(List continued on next page.)

FOREIGN PATENT DOCUMENTS

| | | |
|---|---|---|
| 0711695 | 5/1996 | European Pat. Off. |
| 61-268560 | 11/1986 | Japan. |
| 3-227766 | 10/1991 | Japan. |
| 4-121260 | 4/1992 | Japan. |
| 5-97022 | 4/1993 | Japan. |
| 7-329766 | 12/1995 | Japan. |
| 8-34326 | 2/1996 | Japan. |
| 8-40229 | 2/1996 | Japan. |
| 8-295224 | 11/1996 | Japan. |
| 2282649 | 4/1995 | United Kingdom. |
| 2295209 | 5/1996 | United Kingdom. |
| 2297134 | 7/1996 | United Kingdom. |
| WO96/6763 | 3/1996 | WIPO. |
| WO9710980 | 3/1997 | WIPO. |
| WO9713670 | 4/1997 | WIPO. |

OTHER PUBLICATIONS

U.S. application 09/155,769, filed Oct. 2, 1998, Copending.
U.S. application 09/171,498, filed Oct. 20, 1998, Copending.

(List continued on next page.)

Primary Examiner—Douglas C. Butler
Attorney, Agent, or Firm—Kenyon & Kenyon

[57] ABSTRACT

A brake force control apparatus performs both a brake assist control and an antilock brake control without interference therebetween. A master cylinder generates a brake fluid pressure corresponding to a magnitude of a brake operation. A pump has an inlet port and an outlet port, the inlet port being communicable with the master cylinder. An inlet control valve controls communication between the master cylinder and the inlet port of the pump. A wheel cylinder is communicable with each of the master cylinder and the outlet port of the pump. A supplementary reservoir is communicable with each of the wheel cylinder and the inlet port of the pump. The brake assist control is performed, when the emergency brake operation is performed by the driver, by opening the inlet control valve and actuating the pump. The antilock brake control is performed by controlling communication between said wheel cylinder and each of the master cylinder, the outlet port of the pump and the supplementary reservoir and actuating the pump. The inlet control valve is opened when both the brake assist control and the antilock brake control are performed concurrently.

11 Claims, 12 Drawing Sheets

U.S. PATENT DOCUMENTS

| | | |
|---|---|---|
| 5,445,444 | 8/1995 | Rump et al. . |
| 5,492,397 | 2/1996 | Steiner et al. . |
| 5,496,099 | 3/1996 | Resch . |
| 5,499,866 | 3/1996 | Brugger et al. . |
| 5,513,906 | 5/1996 | Steiner . |
| 5,535,123 | 7/1996 | Rump et al. . |
| 5,549,369 | 8/1996 | Rump et al. . |
| 5,556,173 | 9/1996 | Steiner et al. . |
| 5,564,797 | 10/1996 | Steiner et al. . |
| 5,567,021 | 10/1996 | Gaillard . |
| 5,584,542 | 12/1996 | Klarer et al. . |
| 5,586,814 | 12/1996 | Steiner ................................ 303/116.2 |
| 5,658,055 | 8/1997 | Dieringer et al. . |
| 5,669,676 | 9/1997 | Rump et al. . |
| 5,719,769 | 2/1998 | Brugger et al. . |
| 5,720,532 | 2/1998 | Steiner et al. . |
| 5,727,852 | 3/1998 | Pueschel et al. ..................... 303/113.4 |
| 5,772,290 | 6/1998 | Heibel et al. . |
| 5,779,329 | 7/1998 | Takeshima ........................... 303/114.3 |
| 5,851,057 | 12/1998 | Terazawa et al. .................... 303/114.1 |
| 5,890,776 | 4/1999 | Sawada ................................ 303/116.1 |
| 6,660,448 | 8/1997 | Kiesewetter et al. . |

OTHER PUBLICATIONS

U.S. application 09/171,587, filed Oct. 21, 1998, Copending.

U.S. application 09/171,582, filed Oct. 21, 1998, Copending.

U.S. application 09/171,588, filed Oct. 21, 1998, Copending.

U.S. application 09/171,507, filed Oct. 21, 1998, Copending.

National Phase of PCT/JP97/02509; filed Jul. 18, 1997, claiming Priority of Japanese Appln. 8–204819, filed Aug. 2, 1990, and Japanese Appln. 9–052078, filed Mar. 6, 1997.

National Phase of PCT/JP97/02028, filed Jun. 12, 1997, claiming priority of Japanese Appln. 8–163425, filed Jun. 24, 1996 and Japanese Appln. No. 9–109750, filed Apr. 25, 1997.

National Phase of PCT/JP97/02510, filed Jul. 18, 1997, claiming priority of Japanese Appln. 8–214560, filed Aug. 14, 1996.

U.S.application Ser. No. 09/171,589, filed Oct. 21, 1998, Copending.

U.S. application Ser. No. 09/171,644, filed Oct. 22, 1998, copending.

U.S. application Ser. No. 09/171,645, filed Oct. 22, 1998, copending.

U.S. application Ser. No. 09/180,014, filed Oct. 29, 1998, copending.

U.S. application Ser. No. 09/194,136, filed Nov. 25, 1998, copending.

U.S. application Ser. No. 09/108,007, filed Jun. 30, 1998, Copending.

Patent Abstracts of Japan, vol. 016, No. 374 (M–1293), Aug. 11, 1992 & JP 04 121260 A (Toyota Motor Corp.), Apr. 22, 1992.

Patent Abstracts of Japan, vol. 097, No. 004, Apr. 30, 1997 & JP 08 332935 A (Toyota Motor Corp.), Dec. 17, 1996.

BRAKE FORCE CONTROL APPARATUS FOR PROPERLY PERFORMING BOTH AN ABS FUNCTION AND A BA FUNCTION

BACKGROUND OF THE INVENTION

1. Field of the Invention

The present invention relates to a brake force control apparatus and, more particularly, to a brake force control apparatus which is suitable for controlling a brake force of a vehicle.

2. Description of the Related Art

Conventionally, as disclosed in Japanese Laid-Open Patent Application No.4-121260, a brake force control apparatus generates a brake force greater than that of a normal condition when a brake pedal is depressed at a speed exceeding a predetermined speed. A driver of a vehicle operates a brake pedal at a high speed when the driver desires to rapidly increase a brake force. Thus, according to the above-mentioned process, the brake force intended by the driver can be generated under such circumstances. Hereinafter, the control to generate a brake fluid pressure greater than that of a normal operation as mentioned above is referred to as a brake assist control (BA control).

Additionally, the above-mentioned conventional apparatus performs an antilock brake control (ABS control) for preventing a wheel from being locked by appropriately reducing a wheel cylinder pressure of the wheel when a slip rate of the wheel becomes an excessive value during a brake operation. Thus, according to the above-mentioned conventional apparatus, when a brake operation is performed by a driver, a brake force greater than that of a normal operation can be generated without generation of an excessive slip rate in a wheel.

The above-mentioned BA control and ABS control can be achieved by an apparatus, for example, including: 1) a master cylinder; 2) a master-cut valve which controls a communication state between the master cylinder and a wheel cylinder; 3) a pump; 4) an intake valve which controls a communication state between the master cylinder and an inlet port of the pump; 5) a holding valve which controls a communication state of the wheel cylinder and each of the master cylinder and the pump; 6) a supplementary reservoir which communicates with the inlet port of the pump; and 7) a depressurizing valve which controls a communication state between the supplementary reservoir and the wheel cylinder.

According to the above-mentioned apparatus, a brake fluid in the master cylinder can be delivered by the pump by opening 4) the inlet port and actuating 3) the pump. At this time, the wheel cylinder pressure can be increased by a discharge pressure of the pump by closing 2) the master-cut valve, opening 5) the holding valve and closing 7) the depressurizing valve. Accordingly, when the above-mentioned state (hereinafter, referred to as a BA state) is established, the BA control can be performed.

Additionally, the wheel cylinder is connected to the 6) supplementary reservoir by closing 4) the intake valve and opening 7) the depressurizing valve after the above-mentioned BA state is established. Hereinafter, this state is referred to as an ABS depressurized state. When the ABS depressurized state is established, the brake fluid in the wheel cylinder is released to the supplementary reservoir and the wheel cylinder pressure is decreased. Thus, if the ABS depressurized state is established when an excessive slip rate is generated in a wheel, the ABS control can be performed while the BA control is performed.

In the above-mentioned apparatus, the inlet port of the pump is connected to the master cylinder via the intake valve and is also connected to the supplementary reservoir. Accordingly, the pump intakes brake fluid from the master cylinder or the supplementary reservoir. In the above-mentioned apparatus, the BA control is performed under a condition in which a brake pedal is deeply depressed by a driver, that is, under a condition in which a high-pressure brake fluid is supplied from the master cylinder to the inlet port of the pump. In such a condition, if the brake fluid is stored in the supplementary reservoir, the pump intakes brake fluid from the master cylinder.

Accordingly, in the above-mentioned apparatus, if the BA control and the ABS control are concurrently performed, an amount of brake fluid in the supplementary reservoir is increased each time the above-mentioned ABS depressurized state is established, and finally the supplementary reservoir may be filled up with brake fluid. When the supplementary reservoir is completely filled up with brake fluid, the brake fluid in the wheel cylinder cannot be released to the supplementary reservoir even if the depressurizing valve is opened. In this case, there is a problem in that the wheel cylinder pressure cannot be decreased even if the ABS control is required. Thus, according to the above-mentioned apparatus, when the BA control and the ABS control are concurrently performed, it is difficult to properly achieve the function of the ABS control.

SUMMARY OF THE INVENTION

It is a general object of the present invention to provide an improved and useful brake force control apparatus in which the above-mentioned problems are eliminated.

A more specific object of the present invention is to provide a brake force control apparatus which can properly perform the function of the ABS control when the BA control and the ABS control are concurrently performed.

In order to achieve the above-mentioned objects, there is provided according to the present invention a brake force control apparatus performing a brake assist control and an antilock brake control, the brake assist control being performed, when an emergency brake operation is performed by a driver, for generating a brake fluid pressure higher than a brake fluid pressure generated by a normal brake operation, the antilock brake control being performed for decreasing a wheel cylinder pressure so that an excessive slip rate is not generated by a brake operation, the brake force control apparatus comprising:

a master cylinder generating a brake fluid pressure corresponding to a magnitude of a brake operation;

a pump having an inlet port and an outlet port, the inlet port being communicable with the master cylinder;

an inlet control valve controlling communication between the master cylinder and the inlet port of the pump;

a wheel cylinder communicable with each of the master cylinder and the outlet port of the pump;

a supplementary reservoir communicable with each of the wheel cylinder and the inlet port of the pump;

brake assist means for performing the brake assist control, when the emergency brake operation is performed by the driver, by opening the inlet control valve and actuating the pump;

antilock brake means for performing the antilock brake control by controlling communication between the wheel cylinder and each of the master cylinder, the outlet port of the pump and the supplementary reservoir and actuating the pump; and inlet closing means for closing the inlet control valve when both the brake assist control and the antilock brake control are performed concurrently.

In the present invention, when the brake assist control is required, the inlet control valve is opened. After such a condition is established, the master cylinder pressure which is a high pressure is introduced into the inlet port of the pump. When the brake assist control is being performed, the pump is actuated. Accordingly, when the brake assist control is being performed, the brake fluid in the master cylinder is pumped out by the pump to the wheel cylinder. Accordingly, when the brake assist control is being performed, the wheel cylinder pressure higher than the master cylinder pressure is generated.

In the present invention, when the antilock brake control is being performed, communication between the wheel cylinder and each of the master cylinder, pump and the supplementary reservoir is controlled. When the wheel cylinder communicates with the master cylinder pressure is increased by using the master cylinder, as a fluid pressure source. When the wheel cylinder is disconnected from the master cylinder and connected to the pump, the wheel cylinder pressure is increased by using the pump as a fluid pressure source. Additionally, when the wheel cylinder is communicated with the supplementary reservoir, the brake fluid in the wheel cylinder is released to the supplementary reservoir and the wheel cylinder pressure is decreased. According to the above-mentioned process, when the antilock brake control is being performed, the wheel cylinder pressure is controlled to be an appropriate value at which an excessive slip rate is not generated.

When the antilock brake control is being performed, the pump is actuated so as to pump out the brake fluid flowing into the supplementary reservoir. As mentioned above, when the brake assist control is being performed, the master cylinder pressure which a high pressure is provided to the inlet port of the pump. When the high master cylinder pressure is provided to the inlet port of the pump, the pump cannot pump out the brake fluid in the supplementary reservoir even if the brake fluid is stored in the supplementary reservoir.

In the present invention, after the antilock brake control is started together with the brake assist control, the inlet control valve is closed. When the inlet control valve is closed, the inlet port of the pump is disconnected from the master cylinder. When the pump is disconnected from the master cylinder, the pump suctions the brake fluid in the supplementary reservoir. Accordingly, in the present invention, when the antilock brake control is performed together with the brake assist control, the supplementary reservoir is not filled up with brake fluid.

In the brake force control apparatus according to the present invention, the inlet closing means may close the inlet control valve when an amount of brake fluid stored in the supplementary reservoir exceeds a predetermined amount.

In this invention, the inlet control valve is opened when an amount of the brake fluid stored in the supplementary reservoir exceeds a predetermined amount. Even if the antilock brake control is being performed, there is no need to pump out the brake fluid stored in the supplementary reservoir when the amount of the brake fluid is small. According to the process of the present invention in which the inlet control valve is closed when an amount of brake fluid exceeding the predetermined amount is stored in the supplementary reservoir, the supplementary reservoir is positively prevented from being filled up with brake fluid.

Additionally, in the brake force control apparatus according to the present invention, the inlet closing means may close the inlet control valve when the wheel cylinder is communicated with the supplementary reservoir during execution of the antilock brake control.

In this invention, the inlet control valve is closed when the wheel cylinder is communicated with the supplementary reservoir, that is, when the brake fluid in the wheel cylinder flows to the supplementary reservoir. According to this process, the brake fluid in the supplementary reservoir can be pumped out by the pump under a condition in which an amount of brake fluid in the supplementary reservoir is increased. Thus, according to the present invention, the supplementary reservoir is positively prevented from being filled up with brake fluid.

Additionally, the brake force control apparatus according to the present invention may further comprise:

relief means for selectively establishing a first state and a second state, the first state for communicating the master cylinder with a high-pressure passage connecting the wheel cylinder to the pump, the second state for permitting a flow of brake fluid in a direction from the high-pressure passage to the master cylinder only when a brake fluid pressure in the high-pressure passage is higher than a brake fluid pressure in the master cylinder by a predetermined relief pressure; and accumulating means, communicated with the high-pressure passage, for accumulating the brake fluid pressure in the high-pressure passage.

In this invention, when the brake assist control is being performed, the second state is established so as to prevent the discharge pressure of the pump from being released to the master cylinder when the brake assist control is being performed. In this case, a brake fluid pressure higher than the master cylinder pressure by the relief pressure is generated in the high-pressure passage. When the antilock brake control is started together with the brake assist control, the inlet control valve is closed so that the brake fluid in the supplementary reservoir can be pumped out. After the above-mentioned condition is established, a flow of brake fluid from the master cylinder to the high-pressure passage is prohibited.

When the antilock brake control is being performed, the wheel cylinder may be disconnected from the outlet port of the pump. If the brake fluid in the supplementary reservoir is delivered under such a condition, the brake fluid in the high-pressure passage becomes higher than a sum of the master cylinder pressure and the relief pressure. In this case, the brake fluid in the high-pressure passage passes through the relief means and flows to the master cylinder. Accordingly, when the antilock brake control is started after the brake assist control is started, an amount of brake fluid in a fluid pressure circuit (hereinafter referred to as a high-pressure closed circuit), which comprises the high-pressure passage, the wheel cylinder, the supplementary reservoir and the pump, is decreased.

When the wheel cylinder is communicated with the pump after the amount of brake fluid in the high-pressure closed circuit is decreased as mentioned above, the brake fluid in the high-pressure passage flows to the wheel cylinder. At this time, the brake fluid pressure in the high-pressure passage tends to decrease. In the present invention, the brake fluid pressure in the high-pressure passage is accumulated by the accumulating means. Accordingly, if the brake fluid pressure in the high-pressure passage tends to decrease, the brake fluid stored in the accumulating means flows to the high-pressure passage and, thus, a degree of decrease in the brake fluid pressure is reduced.

When the wheel cylinder is disconnected from the pump again after the brake fluid flows out of the accumulating means, that is, when the condition in which the brake fluid discharged from the pump cannot flow to the wheel cylinder, the brake fluid discharged from the pump flows to the accumulating means. Accordingly, if the antilock brake control is continuously performed together with the brake assist control, an amount of brake fluid in the high-pressure closed circuit is maintained at a constant amount. As a result, the brake fluid in the high-pressure passage is maintained to be at a fluid pressure higher than the master cylinder by the relief pressure.

In the above-mentioned invention, the accumulating means may comprise:

a cylinder communicated with each of the high-pressure passage and the master cylinder;

a space dividing member dividing an inner space of the cylinder into a first space communicating with the high-pressure passage and a second space communicating with the master cylinder so that a volume of the first space and a volume of the second space are varied in response to a difference in a pressure in the first space and a pressure in the second space; and an urging member urging the space dividing member with a predetermined urging force in a direction in which the volume of the first space is reduced.

In this invention, when the brake fluid pressure in the high-pressure passage becomes higher than the master cylinder pressure by a pressure exceeding the predetermined urging force, the brake fluid in the high-pressure passage flows to the first space while the volume of the second space is reduced. As a result, a high fluid pressure higher than the master cylinder pressure by a pressure corresponding to the urging force is stored in the first space. If the brake fluid pressure in the high-pressure passage is decreased, the accumulating means provides the brake fluid stored in the first space to the high-pressure passage while providing brake fluid from the master cylinder to the second space. As a result, a degree of decrease in the brake fluid pressure in the high-pressure passage is reduced.

In the above-mentioned invention, a depressurizing mode, in which the wheel cylinder is communicated with the supplementary reservoir for a predetermined period, may be performed during execution of the antilock brake control; and the volume of the first space may be maintained to be larger than an amount of brake fluid flowing out of the wheel cylinder each time the depressurizing mode is performed when the pressure in the first space is higher than the pressure in the second space by the relief pressure.

In this invention, when the antilock brake control is being performed, the wheel cylinder pressure is decreased by connecting the wheel cylinder to the supplementary reservoir for the predetermined period. At this time, a constant amount (including an amount varied in response to a condition) of brake fluid flows from the wheel cylinder to the supplementary reservoir. The brake fluid flowing into the supplementary reservoir is pumped out by the pump and is discharged to the high-pressure passage. Accordingly, when the antilock brake control is being performed, a constant amount of brake fluid is discharged from the pump to the high-pressure passage each time the depressurizing mode is performed.

The accumulating means stores the predetermined amount of brake fluid therein when the brake fluid in the high-pressure passage is higher than the master cylinder pressure by the relief pressure. In the present invention, the predetermined amount is set to be larger than the above-mentioned constant amount. Accordingly, the accumulating means can positively store the whole brake fluid which is provided from the wheel cylinder to the supplementary reservoir due to execution of the antilock brake operation, that is, the whole brake fluid pumped out of the supplementary reservoir while the antilock brake control is performed. Thus, according to the present invention, when the antilock brake control is being performed, the amount of brake fluid in the high-pressure closed circuit can be prevented from being decreased.

Additionally, the brake force control apparatus according to the above-mentioned invention may further comprise:

relief means for selectively establishing a first state and a second state, the first state for communicating the master cylinder with a high-pressure passage connecting the wheel cylinder to the pump, the second state for permitting a flow of brake fluid in a direction from the high-pressure passage to the master cylinder only when a brake fluid pressure in the high-pressure passage is higher than a brake fluid pressure in the master cylinder by a predetermined relief pressure; and inlet restarting means for opening the inlet control valve until a slip rate of a wheel to be subjected to the antilock brake control reaches a predetermined start threshold value when the slip rate is decreased below a predetermined end threshold value after both the brake assist control and the antilock brake control have been started and before a termination of the brake assist control is required.

In this invention, when the brake assist control is being performed, the second state is established so as to prevent the discharge pressure of the pump from being released to the master cylinder. Thereafter, if the antilock brake control is started, the inlet control valve is closed so that the brake fluid in the supplementary reservoir can be pumped out. When the wheel cylinder is disconnected from the outlet port of the pump in response to a requirement for the antilock brake control after the above-mentioned state is established, an amount of brake fluid in the high-pressure closed circuit is decreased.

If the amount of brake fluid in the high-pressure closed circuit is decreased, the wheel cylinder cannot be increased to a fluid pressure before the amount of brake fluid was decreased even if the wheel cylinder is communicated with the pump. Thus, according to the present invention, the wheel cylinder pressure may be gradually decreased after the antilock brake control is started together with the brake assist control even though the driver requires a large brake force.

The antilock brake control is for decreasing the wheel cylinder pressure so that an excessive slip is not generated in a wheel. Accordingly, if the wheel cylinder pressure is decreased irrelevant to a brake operation by the driver, the decrease in the wheel cylinder pressure during execution of the antilock brake control is appropriate. However, if the wheel cylinder is continuously decreased till the antilock brake control is terminated irrelevant to a brake operation by the driver, the wheel cylinder pressure should be increased again.

In the present invention, if a slip rate of a wheel to be subjected to the antilock brake control is decreased to the end threshold value after the antilock brake control is started together with the brake assist control, the inlet control valve is opened until the slip rate reaches the start threshold value. When the inlet control valve is opened, the pump can suction the brake fluid in the master cylinder, that is, the condition in which an amount of brake fluid in the high-pressure closed circuit can be increased is established. Thus, according to the present invention, when the antilock brake control is being performed together with the brake assist control, the brake fluid pressure in the high-pressure passage can be prevented from being an excessively small value irrelevant to a brake operation of the driver.

The brake force control apparatus according to the above-mentioned invention may further comprise operation tendency detecting means for detecting a tendency of changes in a magnitude of the brake operation, wherein the inlet restarting means includes a first prohibiting means for prohibiting the inlet control valve from being opened when the tendency of changes indicates a decrease in the magnitude of the brake operation.

In this invention, when a magnitude of the brake operation by the driver is decreased after the antilock brake control is started together with the brake assist control, a slip rate of a wheel may be decreased to the end threshold value due to the brake operation. In such a case, the brake fluid pressure in the high-pressure passage should not be increased even if the slip rate of the wheel is decreased. In the present invention, the inlet control valve is prohibited from being opened, that is, an amount of the brake fluid in the high-pressure closed circuit is prohibited from being increased. Thus, when the driver decreases a magnitude of a brake operation, such an intention is accurately reflected in the wheel cylinder pressure.

Additionally, the brake force control apparatus according to the present invention may further comprise a plurality of wheel cylinders communicable with the supplementary reservoir, wherein the inlet restarting means includes second prohibiting means for prohibiting the inlet control valve from being opened when the supplementary reservoir is communicated with one of the plurality of wheel cylinders.

In the present invention, when the antilock brake control is started together with the brake assist control, an amount of brake fluid in the high-pressure closed circuit is gradually decreased. If a slip rate of a wheel is decreased to the end threshold value, the inlet valve is opened so as to increase an amount of brake fluid in the high-pressure closed circuit. When the inlet control valve is opened, the pump cannot suction the brake fluid in the supplementary reservoir since the high-pressure brake fluid is provided from the master cylinder to the inlet of the pump. Brake fluid is provided to the inlet control valve from a plurality of wheel cylinders. In the present invention, when brake fluid is being provided from one of the wheel cylinders, the inlet control valve is prohibited from being opened. In such a case, both a function to increase an amount of brake fluid in the high-pressure closed circuit and a function to prohibit the supplementary reservoir from being filled up with brake fluid are achieved.

Additionally, in the brake force control apparatus according to the present invention, a plurality of wheels may be provided in the same brake fluid pressure system of the vehicle, each of the plurality of wheels being individually subjected to the antilock brake control; and the inlet closing means includes opening means for opening the inlet control valve when a wheel cylinder pressure of one of the wheels which is being subjected to the antilock brake control is not being decreased.

According to this invention, when the depressurizing mode is not performed in one of the wheels in the same brake fluid pressure system, the inlet control valve is opened even though the antilock brake control is being performed. Thereby, the brake fluid in the master cylinder is provided to the high-pressure closed circuit. At this time, since the depressurizing mode is not performed in the wheel subjected to the antilock brake control, a case in which the wheel cylinder pressure cannot be decreased despite that such decrease is required by the antilock brake control does not happen.

In the above-mentioned invention, the opening means may open the inlet control valve when a magnitude of the brake operation is being increased.

Other objects, features and advantages of the present invention will become more apparent from the following detailed description when read in conjunction with the accompanying drawings.

DETAILED DESCRIPTION OF THE PREFERRED EMBODIMENTS

Figure 1:
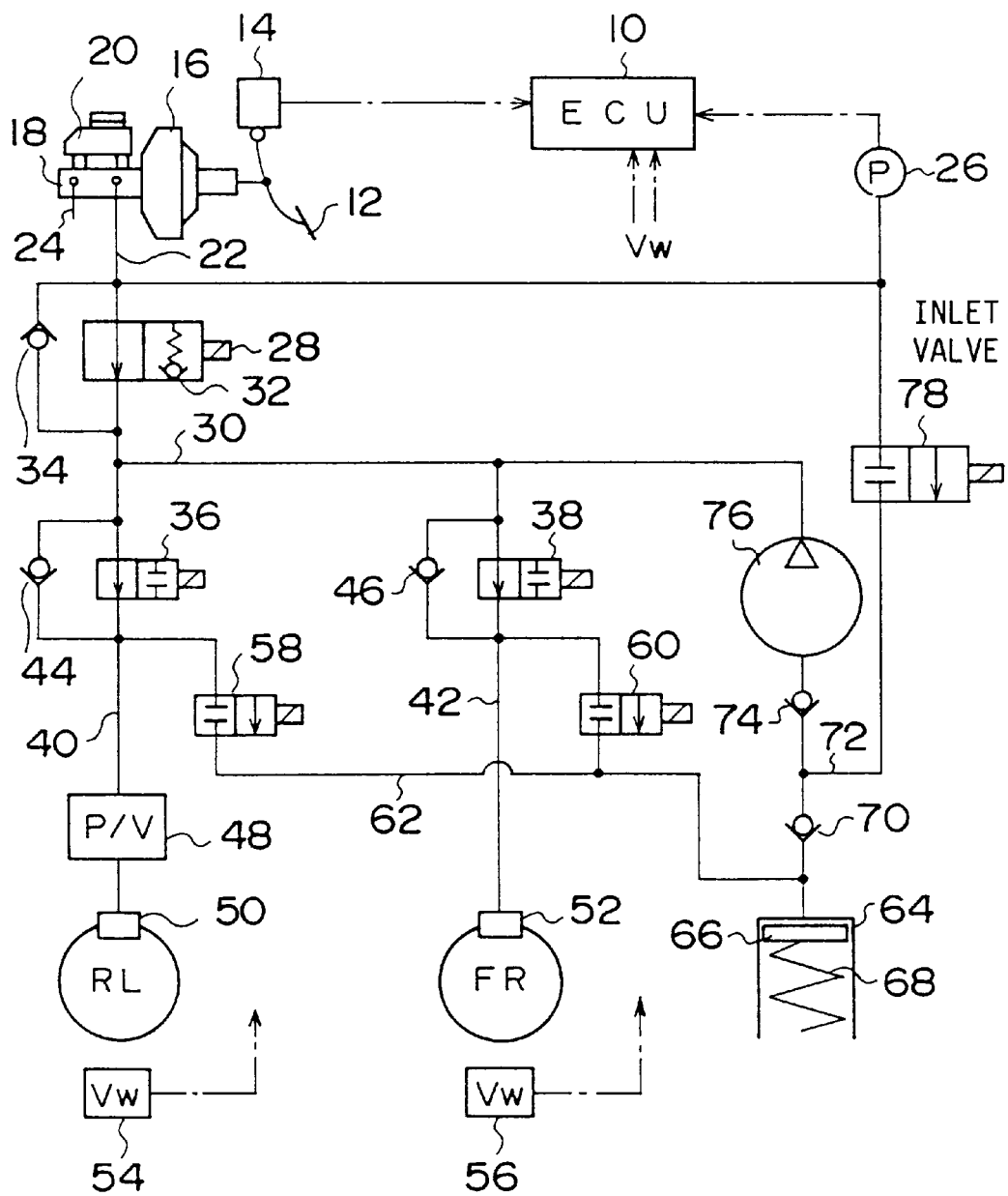
FIG. 1 is a system structure diagram of first to third and fifth embodiments of the present invention.

FIG. 1 shows a system structure diagram of a part of a brake force control apparatus according to a first embodiment of the present invention. The brake force control apparatus according to the present embodiment is provided with two systems including a first system having a front right wheel FR and a rear left wheel RL and a second system having a front left wheel FL and a rear right wheel RR. These two systems have substantially the same structure. Accordingly, in the following description, a structure and an operation of only the first system are explained.

The brake force control apparatus according to the present embodiment is of a diagonal connection type (X-connection type). The brake force control apparatus is controlled by an electronic control unit 10 (hereinafter, referred to as ECU 10). The brake force control apparatus is provided with a brake pedal 12. A brake switch 14 is provided near the brake pedal 12. The brake switch 14 outputs an on-signal when the brake pedal 12 is depressed. The ECU 10 determines whether or not the brake pedal is depressed in accordance with the output signal of the brake switch 14.

The brake pedal 12 is connected to a vacuum booster 16. The vacuum booster 16 generates an assist force Fa having a predetermined power ratio with respect to a brake pressing force F. A master cylinder 18 is mounted to the vacuum booster 16. A first fluid pressure chamber and a second fluid pressure chamber are formed in the master cylinder 18. A master cylinder pressure $P_{M/C}$ is generated in both of the fluid pressure chambers, the master cylinder pressure $P_{M/C}$ corresponding to a sum of the brake pressing force F and the assist force Fa.

A reservoir tank 20 is provided above the master cylinder 18. The master cylinder 18 and the reservoir tank 20 are connected to each other only when a depression of the brake pedal 12 is released. The first fluid pressure chamber and the second fluid pressure chamber of the master cylinder 18 are connected to a first fluid pressure passage 22 and a second fluid pressure passage 24, respectively. The first fluid pressure passage 22 is connected to a fluid pressure circuit of the first system. On the other hand, the second fluid pressure passage 24 is connected to a fluid pressure circuit (not shown in the figure) of the second system.

A fluid pressure sensor 26 is provided to the first fluid pressure passage 22. The fluid pressure sensor 26 outputs an electric signal pMC which corresponds to a pressure in the first fluid pressure passage, that is, a pressure corresponding to the master cylinder pressure $P_{M/C}$ generated by the master cylinder 18. The output signal pMC of the fluid pressure sensor 26 is supplied to the ECU 10. The ECU 10 detects the master cylinder pressure $P_{M/C}$ based on the output signal pMC.

A high-pressure passage 30 is connected to the first fluid pressure passage 22 via a master cut valve 28. The master cut valve 28 is provided with a relief valve 32. The master cut valve 28 is a two-position solenoid valve which is normally open and achieves a state in which the relief valve 32 is interposed between the first fluid pressure passage 22 and the high-pressure passage 30 when a drive signal is supplied by the ECU 10. The relief valve 32 is a constant pressure release valve which permits a flow of brake fluid from the high-pressure passage 30 to the first fluid pressure passage 22 only when a pressure in the high-pressure passage 30 is higher than a pressure in the first fluid pressure passage 22 by a predetermined relief pressure. A check valve 34 is provided in parallel to the master cut valve 28. The check valve 34 is a one-way valve which permits a flow of brake fluid only in a direction from the first fluid pressure passage 22 to the high-pressure passage 30.

The high-pressure passage 30 is connected to control fluid pressure passages 40 and 42 via holding valves 36 and 38. The holding valves 36 and 38 are two-position solenoid valves which are normally open and are closed when a drive signal is supplied by the ECU 10. Check valves 44 and 46 are provided in parallel to the respective holding valves 36 and 38. The check valves 44 and 46 are one-way valves which permit a flow of brake fluid in directions from the control fluid pressure passages 40 and 42 to the high-pressure passage 30.

The control fluid pressure passage 40 is connected to a wheel cylinder 50 of the rear left wheel RL via a proportioning valve 48 (hereinafter, referred to as PV 48). On the other hand, the control fluid pressure passage 42 is connected to a wheel cylinder 52 of the front right wheel FR. When a brake pressure $P_B$ supplied to the control fluid pressure passage 40 is less than a predetermined value, the PV 48 supplies the brake fluid pressure $P_B$ to the wheel cylinder 50 without change. On the other hand, when the brake fluid pressure $P_B$ supplied to the control fluid pressure passage 40 exceeds the predetermined value, the PV 48 supplies the brake fluid pressure $P_B$ to the wheel cylinder 50 after attenuating the brake fluid pressure $P_B$ by a predetermined ratio.

In the system according to the present embodiment, wheel speed sensors 54 and 56 are provided near the respective rear left wheel RL and the front right wheel FR. The wheel speed sensor 54 outputs a pulse signal at a period corresponding to a wheel speed $V_W$ of the rear left wheel RL. The wheel speed sensor 56 outputs a pulse signal at a period corresponding to a wheel speed $V_W$ of the front right wheel FR. The output signals of the wheel speed sensors 54 and 56 are supplied to the ECU 10. The ECU 10 detects the wheel speed $V_W$ of the rear left wheel and the wheel speed $V_W$ of the front right wheel FR based on the output signal of the wheel speed sensors 54 and 56.

The control fluid pressure passages 40 and 42 are connected to a low-pressure passage 62 via respective depressurizing valves 58 and 60. The depressurizing valves 58 and 60 are two-position solenoid valves which are normally closed and are opened when a drive signal is supplied by the ECU 10. The low-pressure passage 62 is connected to a supplementary reservoir 64. The supplementary reservoir 64 is provided with a piston 66 and a spring 68 therein. The supplementary reservoir 64 can store a predetermined amount of brake fluid by elastically deforming a spring 68.

An inlet passage 72 is connected to the supplementary reservoir 64 via a check valve 70. The inlet passage 72 is connected to an inlet of a pump 76 via a check valve 74, and is connected to the first fluid pressure passage 22 via an inlet valve 78. The inlet valve 78 is a two-position solenoid valve which is normally closed, and is opened when a drive signal is supplied by the ECU 10. An outlet of the pump 76 is connected to the high-pressure passage 30. The pump 76 is capable of suctioning a brake fluid from the reservoir tank 64 or the inlet passage 72 and discharges the suctioned brake fluid to the high-pressure passage 30 at a predetermined discharge pressure.

A description will now be given, with reference to FIGS. 2 and 3, of an operation of the brake force control apparatus according to the present embodiment.

Figure 2:
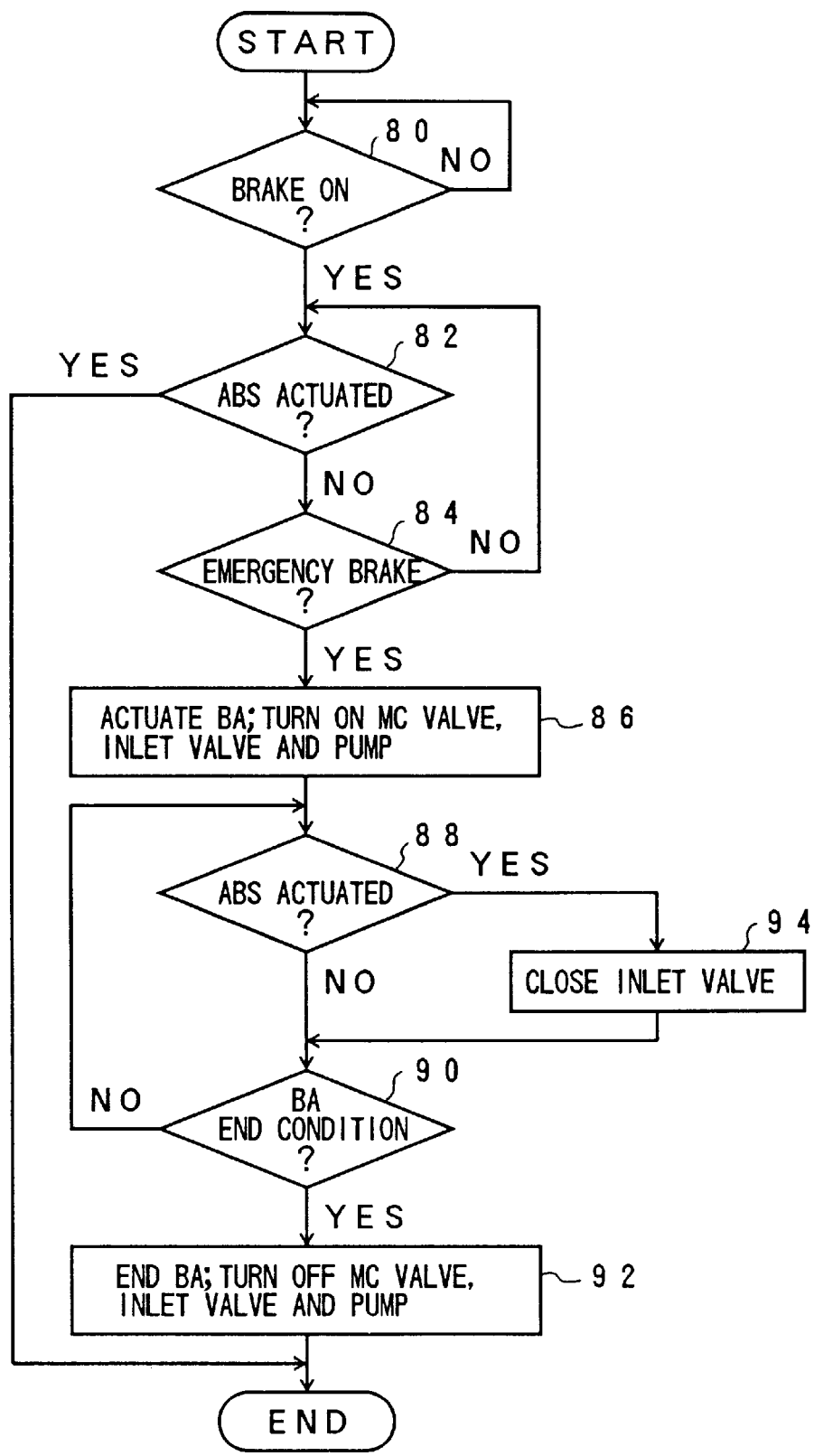
FIG. 2 is a control routine performed by the first embodiment and a seventh embodiment of the present embodiment.

FIG. 2 is a flowchart of an example of a main routine performed by the ECU 10 in the brake force control apparatus according to the present invention. The routine shown in FIG. 2 is repeatedly started after the process thereof is completed. In the routine shown in FIG. 2, the process of step 80 is performed first.

In step 80, it is determined whether or not the on-signal is output from the brake switch 14, that is, whether or not the brake pedal 12 is depressed by a driver. The process of step 80 is repeatedly performed until it is determined that the above-mentioned condition is established. As a result, if it is determined that the on-signal is output from the brake switch 14, the process of step 82 is performed next.

In step 82, it is determined whether or not an antilock brake control (hereinafter referred to as ABS control) is being performed. In the present embodiment, when an excessive slip rate is generated in one of the wheels in a condition in which the brake pedal 12 is depressed, the ECU 10 starts the ABS control so as to reduce the slip rate. Then, the ECU 10 continues the ABS control until a predetermined ABS end condition is established. In the present embodiment, the ABS end condition is determined to be established when the brake operation is ended or when a slip rate of a wheel (hereinafter referred to as ABS objective wheel) which is subjected to the ABS control is decreased to a value less than a predetermined threshold value.

The ECU 10 renders the pump 76 to be actuated, and drives the holding valves 36 and 38 and the depressurizing valves 58 and 60 according to the process of other routines as follows.

(i) The ECU 10 performs a depressurizing mode with respect to a wheel in which a slip rate exceeding the predetermined threshold value is recognized. The depressurizing mode is achieved by closing the holding valves 36 and 38 (on state) and opening the depressurizing valves 58 and 60 (on state). In the depressurizing mode, the wheel cylinders 50 and 52 are disconnected from the high-pressure passage 30, and connected to the supplementary reservoir 64. In this case, the wheel cylinder pressure is reduced by the brake fluid in the wheel cylinders 50 and 52 flowing into the supplementary reservoir 64.

The brake fluid supplied to the supplementary reservoir 64 by an execution of the depressurizing mode is suctioned by the pump 76 and supplied to the high-pressure passage 30. Additionally, a part of the brake fluid supplied from the pump 76 to the high-pressure passage 30 is consumed by being supplied to the wheel cylinders 50 and 52, and the rest of the brake fluid is returned to the master cylinder 18.

The ECU 10 increases the wheel cylinder pressure of the ABS objective wheel at a predetermined slope by combining a (ii) pressurizing mode and a (iii) holding mode after the above-mentioned depressurizing mode is ended. The increase in the wheel cylinder pressure is continued until a slip rate of the ABS objective wheel reaches a start slip rate again.

The (ii) pressurizing mode is achieved by opening the holding valves 36 and 38 (off state) and closing the depressurizing valves 58 and 60 (off state). According to the pressurizing mode, the wheel cylinders 50 and 52 are disconnected from the supplementary reservoir 64 and connected to the master cylinder 18. In this case the wheel cylinder pressure is increased toward the master cylinder pressure.

The (iii) holding mode is achieved by closing the holding valves 36 and 38 (on state) and closing the depressurizing valves 58 and 60 (off state). According to the pressurizing mode, the wheel cylinders 50 and 52 are disconnected from both the supplementary reservoir 64 and the master cylinder 18. Accordingly, in this case, the wheel cylinder pressure is maintained without being increased or decreased.

In the present routine, it is determined, in step 82, that the ABS control is being performed after a slip rate exceeding the start threshold value is recognized in one of the rear left wheel RL and the front right wheel FR and until it is determined that the ABS end condition is established for both the rear left wheel RL and the front right wheel FR. If it is determined, in step 82, that the ABS control is being performed, the present routine is ended without performing any process. On the other hand, if it is determined that the ABS control is not being performed, the process of step 84 is performed next.

In step 84, it is determined whether or not an emergency brake operation is being performed. When a driver intends to perform an emergency brake operation, the brake pedal 12 is depressed deeply at a high speed. Accordingly, in the system according to the present embodiment, it can be determined that the emergency brake operation is being performed when the output signal pMC of the fluid pressure sensor 26 exceeds a predetermined value and a rate of change dpMC/dt thereof exceeds a predetermined value. In step 84, it is determined whether or not an emergency brake operation is being performed by using the above-mentioned method. As a result, if it is determined that an emergency brake operation is not performed, the process of step 82 is performed again.

In the system according to the present embodiment, when an emergency brake operation is not performed by the driver and a slip rate exceeding the start threshold value is not generated in any one of the wheels, the process of steps 82 and 84 is repeatedly performed. The brake force control apparatus is maintained in a normal state as shown in FIG. 1 while the process of steps 82 and 84 are being performed. It should be noted that the normal state shown in FIG. 1 can be achieved by turning off all of the solenoid valves.

According to the normal state shown in FIG. 1, the master cylinder 18 is connected to the wheel cylinders 50 and 52 via the high-pressure passage 30 and the control fluid pressure passages 40 and 42. In this case, the wheel cylinder pressure $P_{W/C}$ of the rear left wheel RF and the front right wheel FR is controlled by using the master cylinder 18 as a fluid pressure source. Accordingly, in the normal state shown in FIG. 1, the wheel cylinder pressure $P_{W/C}$ corresponding to a magnitude of a brake operation can be generated in the wheel cylinders 50 and 52 similar to a normal brake operation. As mentioned above, in the brake force control apparatus according to the present embodiment, when the ABS control is not performed and an emergency brake operation is not performed by the driver, a function of the normal brake apparatus can be achieved.

If an emergency brake operation is performed by the driver in a condition in which the brake force control apparatus is maintained in a normal state, the condition of step 84 is established, and the process of step 86 is performed next.

In step 86, the master cut valve 28 is closed (on state), the inlet valve 78 is open (on state) and the pump 76 is turned on.

In the system according to the present embodiment, when the master cut valve 28 is closed, the relief valve is interposed between the high-pressure passage 30 and the first fluid pressure passage 22. In this case, the fluid pressure in the high-pressure passage 30 is higher than the fluid pressure in the first fluid pressure passage 22, that is, the master cylinder pressure $P_{M/C}$ by the relief pressure.

In the system according to the present embodiment, when the inlet valve 78 is opened, the brake fluid in the first fluid pressure passage 22 reaches the inlet of the pump 76. When the pump 76 is turned on in this condition, the pump 76 suctions the brake fluid in the first fluid pressure passage 22, and discharges the suctioned fluid pressure to the high-pressure passage 30. The pump is capable of generating a pressure higher than the master cylinder pressure $P_{M/C}$. Accordingly, when the process of step 86 is performed, that is, when the master cut valve 28 is closed, the inlet valve 78 is opened and the pump 76 is turned on. The pressure in the high-pressure passage 30 is controlled to be a pressure higher than the master cylinder pressure $P_{M/C}$ by the relief pressure of the relief valve 32. Hereinafter, this fluid pressure is referred to as brake fluid pressure $P_B$.

As mentioned above, according to the brake force of the present embodiment, when an emergency brake operation is performed by the driver, the brake fluid pressure $P_B$ which is higher than the master cylinder pressure $P_{M/C}$ by the predetermined relief pressure, can be generated in the high-pressure passage 30. Thus, according to the brake force control apparatus of the present embodiment, when an emergency brake operation is performed by the driver, the wheel cylinder pressure $P_{W/C}$ higher than that of a normal brake operation can be generated in the wheel cylinders 50 and 52. Hereinafter, the control in which the wheel cylinder pressure $P_{W/C}$ is higher than that of a normal brake operation is referred to as a brake assist control (BA control).

In the present routine, after the process of step 86 is performed, that is, the process for starting the BA control is performed, the process of step 88 is performed next.

In step 88, is it determined whether or not the ABS control is being performed. As a result, if it is determined that the ABS control is not being performed, the process of step 90 is performed next.

In step 90, it is determined whether or not a condition (hereinafter referred to a BA end condition) for ending the BA control is established. The BA end condition is determined to be established when a vehicle speed V is sufficiently decreased, or when a brake operation by the driver is released. If it is determined, in step 90, that the BA end condition is not established, the process of step 88 is performed again.

In the system according to the present embodiment, if a slip rate exceeding the start threshold value is not generated in any one of the wheels, the process of steps 88 and 90 is repeatedly performed until it is determined that the BA end condition is established. In the brake force control apparatus, the BA control is continuously performed while the process of steps 88 and 90 is performed.

Figure 3:
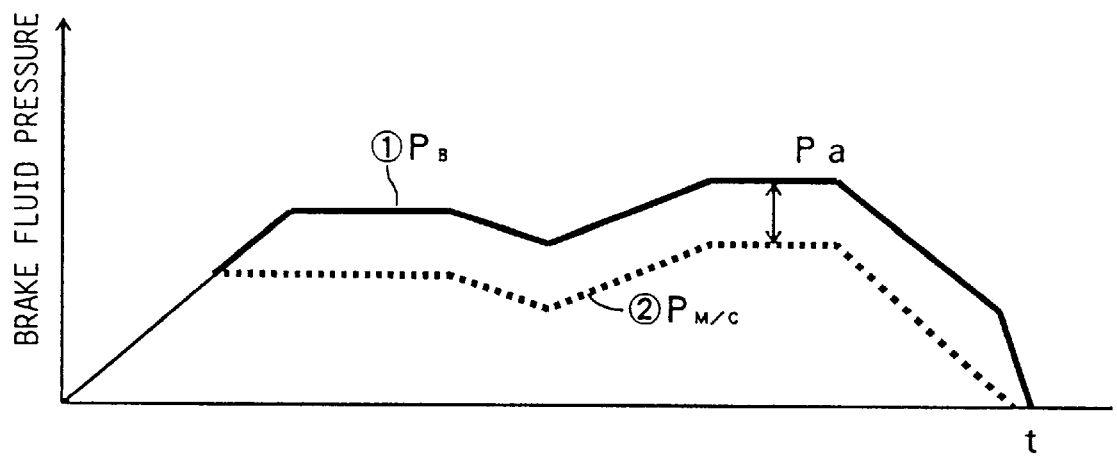
FIG. 3 is a graph showing a change (a solid line ①) in a brake fluid pressure $P_B$ and a change (a dotted line ②) in a master cylinder pressure $P_{M/C}$ generated in a brake force control apparatus according to the first embodiment of the present invention.

FIG. 3 is a graph showing a change (a solid line ①) in the brake fluid pressure $P_B$ and a change (a dotted line ②) in the master cylinder pressure $P_{M/C}$ when the BA control is performed. As mentioned above, when the BA control is being performed, the brake fluid pressure $P_B$ which is higher than the master cylinder pressure $P_{M/C}$ by the relief pressure of the relief valve 32 is generated. Accordingly, as shown in FIG. 3, the brake fluid pressure $P_B$ in the high-pressure passage 30 is always controlled to be a pressure higher than the master cylinder pressure $P_{M/C}$ when the BA control is being performed.

When the brake fluid pressure $P_B$ which is higher than the master cylinder pressure $P_{M/C}$ by the assist pressure Pa is introduced into the high-pressure passage 30, a deceleration which is greater than a deceleration which is generated when the master cylinder pressure $P_{M/C}$ is introduced into the high-pressure passage 30 is generated. Hereinafter, the deceleration generated in response to the master cylinder pressure $P_{M/C}$ is referred to as a normal deceleration G0, and the deceleration generated by the assist pressure Pa is referred to as an assist deceleration Ga.

In the present embodiment, the assist pressure Pa (that is, the relief pressure) is set to a value by which the assist deceleration Ga is 0.3 G. Accordingly, when the BA control is being performed, a deceleration greater than the normal deceleration G0 by about 0.3 G is generated in the vehicle. The normal deceleration G0 fluctuates due to increase and decrease in the master cylinder pressure $P_{M/C}$, that is, increase and decrease in a magnitude of a brake operation by the driver. Thus, according to the brake force control apparatus of the present embodiment, a deceleration of the vehicle can be increased or decreased according to the driver's intention while maintaining a substantially constant assist deceleration Ga when the BA control is being performed.

In the present routine, if it is determined, in step 90, that the BA end condition is established, the process of step 92 is performed next.

In step 92, the master cut valve 28 is opened (off state), the inlet valve 78 is closed (off state) and the pump 76 is turned off. After the process of step 92 is performed, the brake force control apparatus returns to the normal state as shown in FIG. 1, that is, a state in which a function of a normal brake is achieved. After the process of step 92 is completed, the routine is ended.

In step 94, the inlet valve 78 is closed (off state). After the process of step 94 is completed, the process of step 90 is performed.

When the BA control is started in the brake force control apparatus according to the present embodiment, the wheel cylinder pressure in each wheel is increased to a pressure which is higher than the master cylinder pressure by the assist pressure Pa. Thereby, when the BA control is started, a slip rate exceeding the start threshold value may be generated in one of the wheels. The ECU 10 performs the ABS control in parallel with the BA control when a slip rate exceeding the start threshold value is recognized in one of the wheels after the BA control is started. Hereinafter, this control is referred to as BA+ABS control. In step 88, it is determined that the ABS control is being performed in such a condition.

As mentioned above, when the ABS control is being performed, the brake fluid in the wheel cylinders 50 and 52 is released to the supplementary reservoir 64 so as to decrease the wheel cylinder pressure. Accordingly, when the ABS control is being performed, the brake fluid in the supplementary reservoir 64 must be pumped out so that the supplementary reservoir 64 is not filled up with the brake fluid.

In the system according to the present embodiment, when the BA control is not being performed, the master cylinder pressure does not reach the inlet port of the pump 76. In this case, the brake fluid stored in the supplementary reservoir 64 is suctioned into the pump 76 by merely actuating the pump 76. Accordingly, when the ABS control is performed solely, the brake fluid in the supplementary reservoir 64 can be pumped up by merely actuating the pump 76.

However, when the BA control is being performed, the master cylinder pressure, which is a high pressure, is provided to the inlet port of the pump 76. When the pump 76 is actuated in such a condition, the pump 76 suctions brake fluid from the master cylinder 18 even if brake fluid is stored in the supplementary reservoir 64. Accordingly, when the ABS control is performed subsequent to the BA control, the brake fluid in the supplementary reservoir 64 cannot be pumped out by the pump 76 by merely actuating the pump 76.

On the other hand, when the process of step 94 is performed, that is, when the process for closing the inlet valve 78 is performed when the BA+ABS control is required, the master cylinder pressure is prevented from reaching the pump 76. In this case, the pump 76 generates the brake fluid pressure $P_B$, which is higher than the master cylinder pressure, by suctioning the brake fluid in the supplementary reservoir 64.

As mentioned above, according to the brake force control apparatus of the present embodiment, when the BA+ABS control is started, the brake fluid flowing into the supplementary reservoir 64 can be appropriately introduced into the pump 76. Additionally, the brake fluid pressure $P_B$ higher than the master cylinder pressure can be generated in the high-pressure passage 30 by utilizing the discharge pressure of the pump 76. Thus, according to the brake force control apparatus of the present embodiment, the function of the BA control and the function of the ABS control can be appropriately performed when the BA+ABS control is being performed.

It should be noted that, in the above-mentioned embodiment, the inlet valve 78 corresponds to an "inlet control valve". Additionally, a "brake assist means" is achieved by the ECU 10 performing the process of step 86; an "antilock brake means" is achieved by the ECU 10 appropriately controlling the pump 76, the holding valves 36 and 38 and the depressurizing valves 58 and 60; and an "inlet closing means" is achieved by the ECU 10 performing the process of step 88 and 94.

A description will now be given of a second embodiment of the present invention. A brake force control apparatus according to the second embodiment is achieved by having the ECU 10 perform a routine of FIG. 4 in the system structure shown in FIG. 1. The brake force control apparatus according to the present embodiment has a feature in that the inlet valve 78 is opened only when the depressurizing mode is performed in one of the wheels in accordance with the ABS control when the BA+ABS control is being performed.

Figure 4:
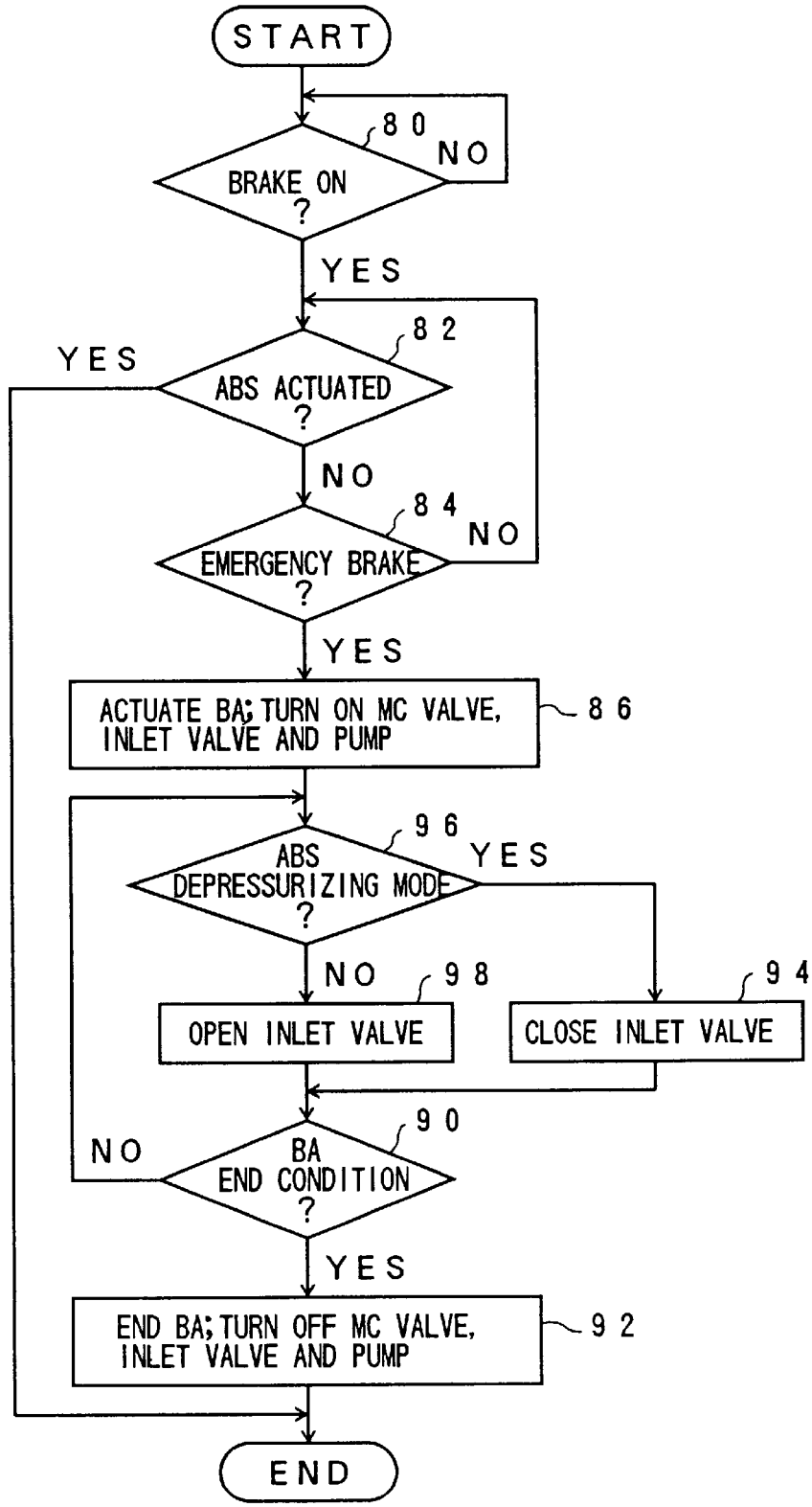
FIG. 4 is a flowchart of a control routine performed by the second embodiment of the present invention.

FIG. 4 is a flowchart of an example of a control routine performed by the ECU 10 so as to achieve the above-mentioned function. The routine shown in FIG. 4 is started each time the process thereof is completed. It should be noted that, in FIG. 4, steps that are the same as the steps shown in FIG. 2 are given the same reference numerals, and descriptions thereof will be omitted.

In the present embodiment, when an emergency brake operation is performed by the driver, the process of step 96 is performed after the process of step 86 is performed, that is, the process for starting the BA control is performed.

In step 96, it is determined whether or not the depressurizing mode is being performed in one of the rear left wheel RL and the front right wheel FR in accordance with the requirement for the ABS control. As a result, if it is determined that the depressurizing mode is not being performed in any one of the wheels, the process of step 98 is performed next. On the other hand, if it is determined that the depressurizing mode is being performed in one of the wheels, the process of step 94 is performed next.

In step 98, the inlet valve 78 is opened (on state). After the process of step 98 is completed, the process of step 90 is then performed.

According to the above-mentioned process, the inlet valve 78 is closed only when the brake fluid flows from at least one of the wheel cylinders 50 and 52 to the supplementary reservoir 64. When the inlet valve 78 is closed, the brake fluid in the supplementary reservoir 64 is pumped out by the pump 76. Thus, according to the above-mentioned process, the brake fluid flowing from the wheel cylinders 50 and 52 to the supplementary reservoir 64 is prevented from being stored in the supplementary reservoir 64.

In the brake force control apparatus of the present embodiment, a fluid pressure circuit (hereinafter referred to as a high-pressure closed circuit) which includes the high-pressure passage 30, the wheel cylinders 50 and 52, the supplementary reservoir 64 and the pump 76 is connected to the first fluid pressure passage 22 via the check valve 34 and the master cut valve 28 and also via the inlet passage 72 and the inlet valve 78. Accordingly, an amount of brake fluid in the high-pressure closed circuit is increased and decreased when the brake fluid flows between the high-pressure closed circuit and the first fluid pressure passage 22.

In the brake force control apparatus according to the present embodiment, when the BA+ABS control is being performed, both the holding valves may be in a closed state. In this case, the brake fluid discharged from the pump 76 does not reach any one of the wheel cylinders 50 and 52, and flows to the first fluid pressure passage 22 by passing the relief valve 32. Thus, according to the brake force control apparatus of the present embodiment, an amount of brake fluid in the high-pressure closed circuit may be decreased when the BA+ABS control is being performed.

In the brake force control apparatus according to the present embodiment, the master cut valve 28 is turned on when the BA+ABS control is being performed. In this case, a flow of the brake fluid from the first fluid pressure passage 22 to the high-pressure closed circuit is permitted by the check valve 34 and the inlet valve 78.

The check valve 34 permits the flow of the brake fluid from the first fluid pressure passage 22 to the high-pressure closed circuit only when the brake fluid pressure $P_B$ in the high-pressure passage 30 is lower than the master cylinder pressure. On the other hand, when the BA+ABS control is being performed, the brake fluid pressure $P_B$ in the high-pressure passage 30 is controlled to be a fluid pressure higher than the master cylinder pressure. Accordingly, when the BA+ABS control is being performed, the brake fluid cannot flow into the high-pressure closed circuit via the check valve 34.

That is, in the brake force control apparatus according to the present embodiment, when the BA+ABS control is being performed, the brake fluid can be provided to the high-pressure closed circuit only by opening the inlet valve 78. Accordingly, in order to prevent an amount of brake fluid in the high-pressure closed circuit from being gradually decreased when the BA+ABS control is being performed in the brake force control apparatus according to the present embodiment, the inlet valve 78 must be appropriately opened during the BA+ABS control.

In the present embodiment, as mentioned above, the inlet valve 78 is controlled to be closed only when the depressurizing mode is performed in one of the wheels when the BA+ABS control is being performed (refer to step 94). In other words, the inlet valve 78 is controlled to be open when the depressurizing mode is performed in any one of the wheels even if the BA+ABS control is being performed. Thus, according to the brake force control apparatus of the present embodiment, the function of the ABS control and the function of the BA control can be appropriately achieved by maintaining a sufficient amount of brake fluid in the high-pressure closed circuit while preventing the brake fluid being filled in the supplementary reservoir 64 during the BA+ABS control.

It should be noted that, in the above-mentioned embodiment, an "inlet closing means" is achieved by the ECU 10 performing the process of steps 94 to 98.

A description will now be given of a third embodiment of the present invention. A brake force control apparatus according to the third embodiment of the present invention is achieved by the ECU 10 performing a routine shown in FIGS. 5 and 6 in the system structure shown in FIG. 1. The brake force control apparatus according to the present embodiment has a feature in that the wheel cylinder pressure of the ABS objective wheel is increased to a level at which the ABS control is started again after the ABS control is ended even though a magnitude of a brake operation by the driver is not decreased during the BA+ABS control.

Figure 5:
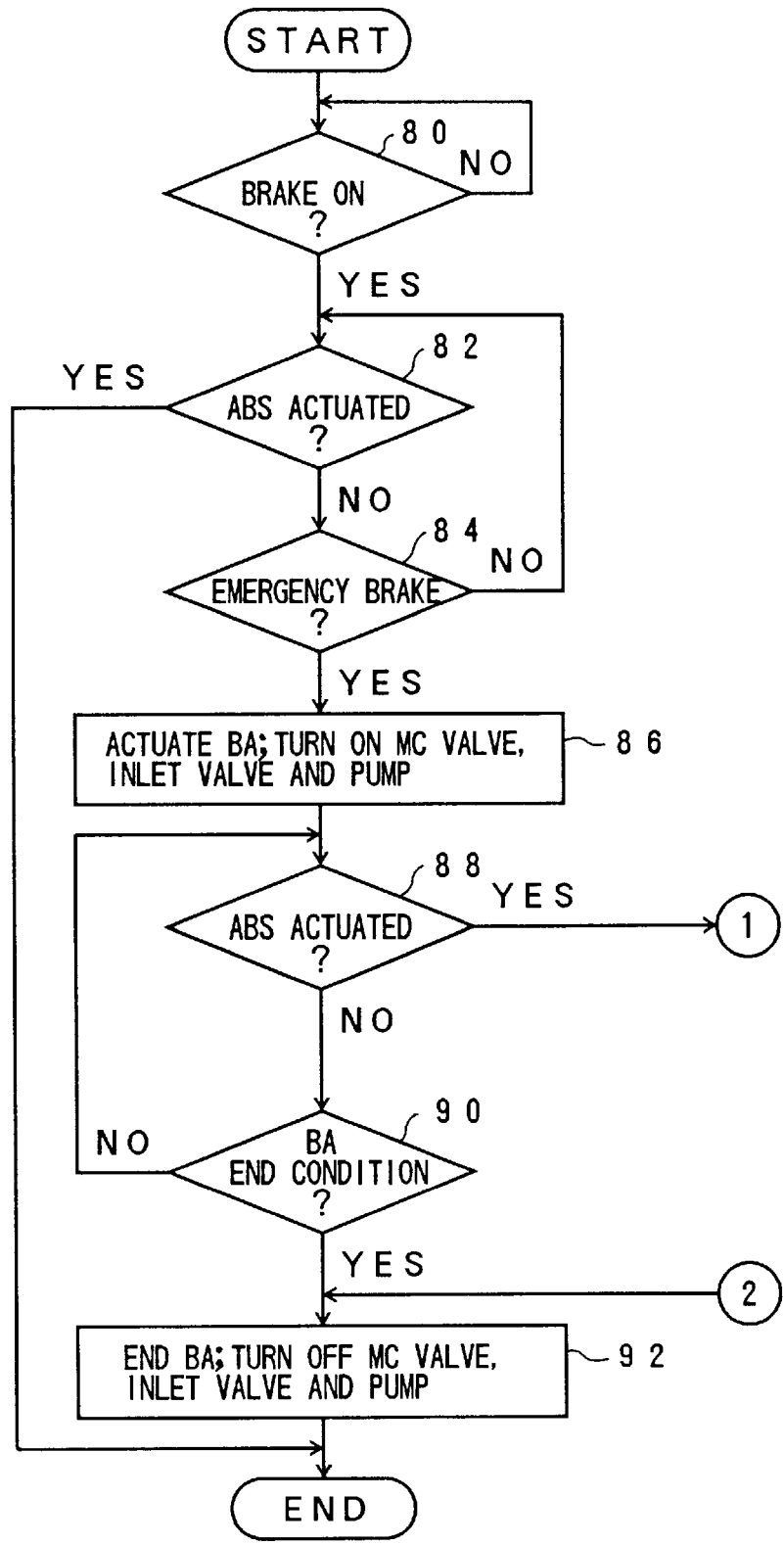
FIG. 5 is a flowchart of a part of a control routine performed in the third embodiment of the present invention.
Figure 6:
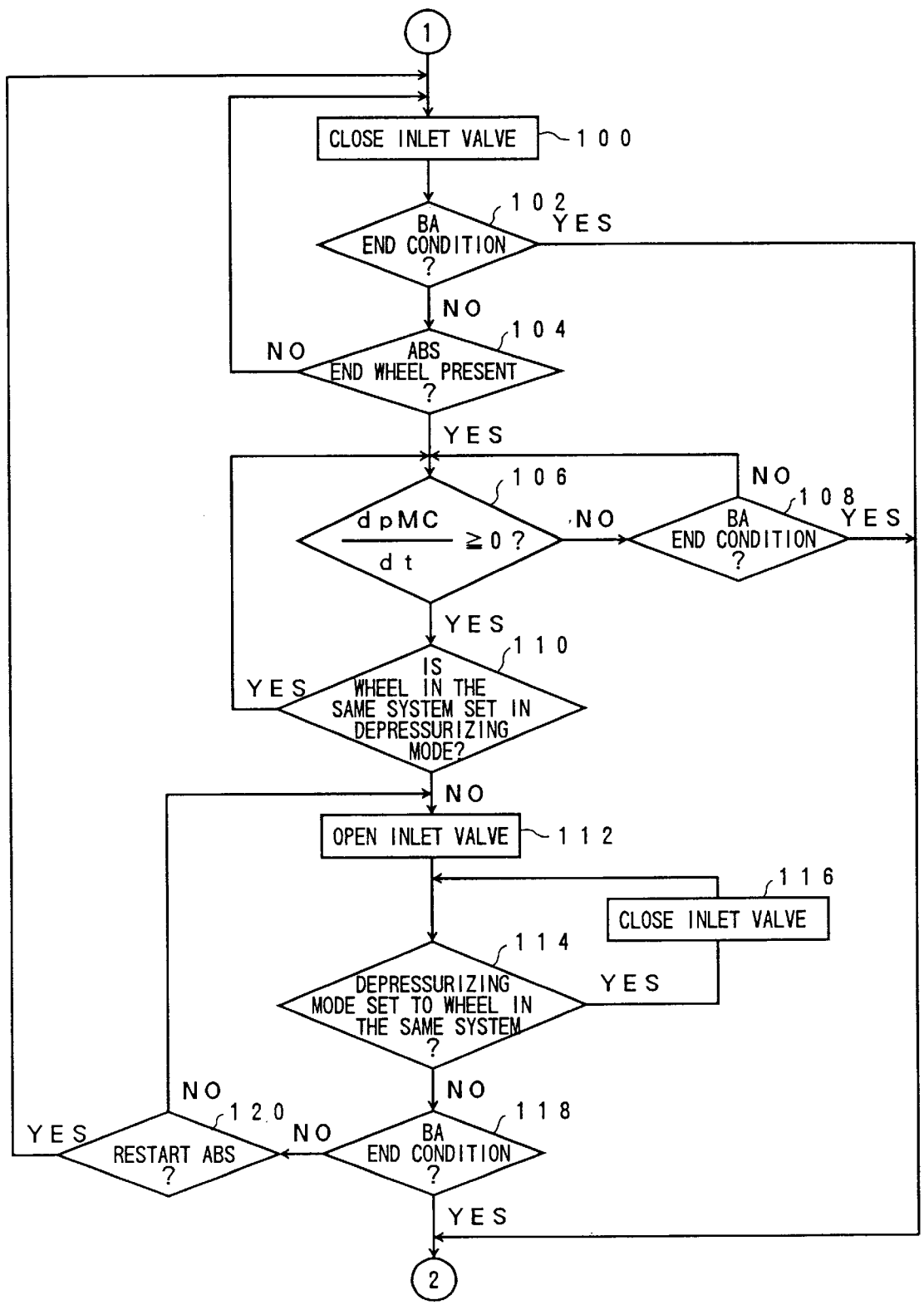
FIG. 6 is a flowchart of a part of a control routine performed in the third embodiment of the present invention.

FIGS. 5 and 6 show a flowchart of an example of a control routine performed by the ECU 10 so as to achieve the above-mentioned function. The routine shown in FIGS. 5 and 6 is started each time the process thereof is completed. It should be noted that, in FIGS. 5 and 6, steps that are the same as the steps shown in FIG. 2 are given the same reference numerals, and descriptions thereof will be omitted.

In the routine according to the present embodiment, if it is determined (step 88) that the ABS control is being performed after the BA control is started, the process of step 100 and subsequent steps is performed.

In step 100, the inlet valve 78 is closed. After the process of step 100 is performed, a condition in which the brake fluid flowing from the wheel cylinders 50 and 52 to the supplementary reservoir 64 can be pumped out by the pump 76 is established.

In step 102, it is determined whether or not the BA end condition is established. As a result, if it is determined that the BA end condition is not established, the process of step 104 is then performed. On the other hand, if it is determined that the BA end condition is established, the process of step 92 shown in FIG. 5 is performed and then the present routine is ended.

In step 104, it is determined whether or not there is a wheel in which the ABS control is ended after the BA+ABS control is started, that is, after it is determined, in step 88, that the ABS control is being performed. The condition of step 104 is established when a slip rate of one of the wheels is decreased below the predetermined threshold value and, as a result, the ABS control is ended in that wheel. If it is determined, in step 104, that the ABS control has not been ended in each of the rear left wheel RL and the front right wheel FR, the process of step 100 is performed again. On the other hand, is it is determined that the ABS control has been ended in at least one of the rear left wheel RL and the front right wheel FR, the process of step 106 is performed.

In the brake force control apparatus according to the present embodiment, when the inlet valve 78 is closed in step 100 after the BA+ABS control is started, the brake fluid is prevented from flowing to the high-pressure closed circuit. On the other hand, the brake fluid in the high-pressure closed circuit flows to the first fluid pressure passage 22 by both the holding valves 36 and 38 being closed during the BA+ABS control. Accordingly, in a process for repeating the process of steps 100 to 104, the brake fluid pressure $P_B$ in the high-pressure passage 30 may be decreased by a magnitude at which the ABS objective wheel is decreased below an end threshold value, that is, a magnitude at which the ABS control is ended even if a magnitude of a brake operation is not decreased.

The ABS control is for depressurizing a wheel cylinder pressure to reduce a slip rate of a wheel. Accordingly, even if the brake fluid pressure $P_B$ is low irrelevant to a brake operation by the driver after the BA+ABS control is started, the decrease in the brake fluid pressure $P_B$ is not a problem as long as the ABS control is continued. However, if the brake fluid pressure $P_B$ is decreased irrelevant to a brake operation by the driver and, as a result, the ABS control is ended after the BA+ABS control is started, it is appropriate to increase the brake fluid pressure $P_B$ until the ABS control is started again so as to generate a larger brake force.

In the present routine, the ECU 10 achieves the above-mentioned function by performing the process of step 106 and subsequent steps after the BA+ABS control is started.

In step 106, it is determined whether or not the rate of change dpMC/dt of the output signal pMC of the fluid pressure sensor 26 is equal to "0" or a positive value. As a result, if it is determined that dpMC/dt≧0 is not established, that is, if the output signal pMC has a negative slope, it can be determined that the driver intends to decrease a magnitude of the brake operation. When the driver intends to decrease a magnitude of the brake operation, the amount of the brake fluid in the high-pressure closed circuit is decreased. Thus, as a result, if the brake fluid pressure $P_B$ is decreased, there is no need to increase the brake fluid pressure $P_B$. In this case, the process of step 108 is performed next.

In step 108, it is determined whether or not the BA end condition is established. If the driver does not need a large brake force and, as a result, the magnitude of the brake operation is ecreased, the BA end condition is finally established. In this case, it is appropriate to end the BA control in accordance with a normal process. In the present routine, if it is determined, in step 108, that the BA end condition is established, the process of step 92 shown in FIG. 5 is performed and, then, the routine is ended. On the other hand, if it is determined that the BA end condition is not established, it can be determined that the driver still requires a brake force though the magnitude of the brake operation is decreased. In this case, the process of step 106 is performed again.

In the present routine, if it is determined, in step 106, that dpMC/dt≧0 is established, that is, if the output signal pMC is equal to "0" or a positive value, it can be determined that the driver intends to hold or increase the magnitude of the brake operation. When the driver intends to hold or increase the magnitude of the brake operation during the BA+ABS control, it is appropriate to increase the brake fluid pressure in the high-pressure passage 30 to a level at which the ABS control is restarted with an upper limit value which is a fluid pressure higher than the master cylinder pressure by the assist pressure Pa. In the present routine, in this case, the process of step 110 is performed subsequent to step 106.

In step 110, it is determined whether or not the depressurizing mode is performed in other wheels belong to the same system as the wheel in which the ABS control has been ended. Specifically, if the ABS control is ended in the rear left wheel RL, it is determined whether or not the depressurizing mode is being performed in the front right wheel FR. On the other hand, if the ABS control is ended in the front rear wheel FR, it is determined whether or not the depressurizing mode is being performed in the rear left wheel RL. If the depressurizing mode is performed in other wheels in the same system, it is appropriate to maintain the condition in which the brake fluid flowing from the wheel cylinder of that wheel to the supplementary reservoir 64 can be pumped out by the pump 76.

Accordingly, if it is determined, in step 110, that the depressurizing mode is performed in other wheels in the same system, the process of step 106 is performed again. On the other hand, if it is determined, in step 110, that the depressurizing mode is not being performed in other wheels in the same system, the process of step 112 is performed.

In step 112, the inlet valve 78 is opened (on state). If the inlet valve 78 is opened, the pump 76 suctions brake fluid from the first fluid pressure passage 22 and supplies the brake fluid to the high-pressure closed circuit. At this time, since the depressurizing mode is not being performed in the wheels that belong to the first system, there is no possibility that a condition is established in which the wheel cylinder pressure of the ABS objective wheel cannot vary in response to a requirement of the ABS control. Specifically, there is no possibility that the wheel cylinder pressure of the ABS objective wheel cannot be decreased in response to a requirement of the ABS control.

Similar to step 110, it is determined, in step 114, whether or not the depressurizing mode is being performed in other wheels in the same system. As a result, if it is determined that the depressurizing mode is being performed, the process of step 116 is performed. On the other hand, if it is determined that the depressurizing mode is not being performed, the process of step 118 is performed.

In step 116, the inlet valve 78 is closed (off state). After the process of step 116 is performed, a condition is established in which the brake fluid in the supplementary reservoir 64 can be pumped out by the pump 76. After the process of step 116 is ended, the process of step 114 is performed again.

In step 118, it is determined whether or not the BA end condition is established. As a result, if it is determined that the BA end condition is established, the process of step 92 shown in FIG. 5 is performed and, then, the present routine is ended. On the other hand, if it is determined that the BA end condition is not established, the process of step 120 is performed.

In step 120, it is determined whether or not the ABS control is restarted in the wheel to which the end of the ABS control is recognized. As a result, if it is determined that the ABS control has not been restarted, it can be determined that an amount of brake fluid in the high-pressure closed circuit has not been returned to an amount sufficient for restarting the ABS control. In this case, the process of step 112 is performed again.

According to the above-mentioned process, the process (step 112) for opening the inlet valve 78 is repeatedly performed until the amount of brake fluid in the high-pressure closed circuit reaches an amount sufficient for restarting the ABS control. As a result, when a sufficient amount of brake fluid is provided from the first fluid pressure passage 22 to the high-pressure closed circuit, a condition is established in which it is determined, in step 120, that the ABS control is established. In the present routine, if it is determined, in step 120, that the ABS control is restarted, the process of step 100 is performed again.

According to the above-mentioned process, when the ABS control is ended due to a decrease in an amount of brake fluid in the high-pressure closed circuit after the BA+ABS control is started, the brake fluid pressure $P_B$ can be increased by providing brake fluid to the high-pressure closed circuit until the ABS control is restarted. Additionally, according to the above-mentioned process, when a brake operation in which the driver intends to decrease a magnitude of the brake operation is performed, the brake fluid can be prevented from being provided to the high-pressure closed circuit. Further, according to the above-mentioned process, when the depressurizing mode is performed in other wheels that belong to the same system, a condition in which the brake fluid in the supplementary reservoir 64 can be pumped out can be maintained by prohibiting supply of brake fluid to the high-pressure closed circuit. Thus, according to the brake force control apparatus of the present embodiment, the function of the BA control and the function of the ABS control can be appropriately maintained while an intention of the driver is reflected in the brake force after the BA+ABS control is started.

It should be noted that, in the above-mentioned embodiment, the master cut valve 28 corresponds to a "relief means". Additionally, a "first state" is achieved by the master cut valve being turned off, and a "second state" is achieved by the master cut valve 28 being turned on. Further, in the above-mentioned embodiment, an "inlet restarting means" is achieved by the ECU 10 performing the process of steps 104, 112 and 120.

Additionally, in the above-mentioned embodiment, an "operation tendency detecting means" and a "first prohibiting means" are achieved by the ECU 10 performing the process of step 106. A "second prohibiting means" is achieved by the ECU 10 performing the process of steps 110 and 114.

A description will now be given, with reference to FIGS. 7 and 8, of a fourth embodiment of the present invention.

Figure 7:
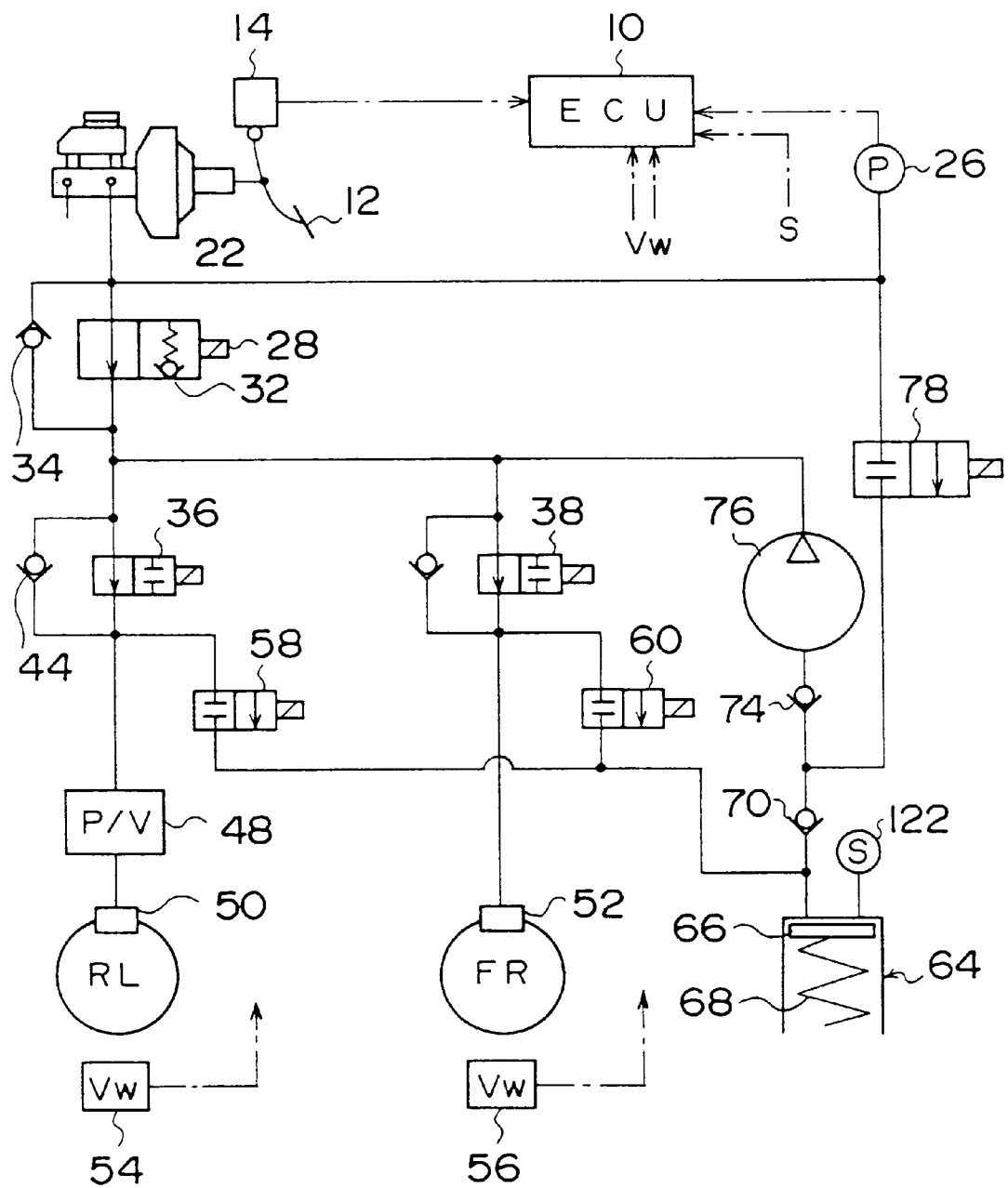
FIG. 7 is a system structure diagram of a brake force control apparatus according to a fourth embodiment of the present invention.

FIG. 7 is a system structure diagram of a part of a brake force control apparatus according to the fourth embodiment of the present invention. The brake force control apparatus according to the present embodiment can be achieved by having the ECU 10 perform a routine shown in FIG. 8 in the system structure shown in FIG. 7. It should be noted that, in FIG. 7, parts that are the same as the parts shown in FIG. 1 are given the same reference numerals, and descriptions thereof will be omitted.

As shown in FIG. 7, the brake force control apparatus according to the present embodiment comprises a stroke switch 122 provided near the supplementary reservoir 64. The stroke switch 122 is a sensor which outputs an on-signal when the piston 66 of the supplementary reservoir 64 is displaced. The piston 66 is displaced when brake fluid is stored in the supplementary reservoir 64. The ECU 10 determines whether or not brake fluid is stored in the supplementary reservoir 64 based on the output signal of the stroke switch 122.

In the brake force control apparatus of the present embodiment, the pump 76 cannot suction the brake fluid in the supplementary reservoir 64 when the master cylinder pressure is supplied thereto. Accordingly, if it is necessary to pump out the brake fluid in the supplementary reservoir 64, the inlet valve 78 must be closed. On the other hand, in the brake force control apparatus according to the present embodiment, if the inlet valve 78 is maintained in a closed state even though the brake fluid is not stored in the supplementary reservoir 64, the brake fluid pressure $P_B$ in the high-pressure passage 30 cannot be increased. Accordingly, it is appropriate to open the inlet valve 78 when brake fluid is not stored in the supplementary reservoir 64 and it is desirous to increase the brake fluid pressure $P_B$.

The brake force control apparatus according to the present embodiment has a feature in that the ECU 10 determines whether or not brake fluid is stored in the supplementary reservoir 64 based on the output signal of the stroke switch 122, and controls the inlet valve 78 based on the result of the determination.

Figure 8:
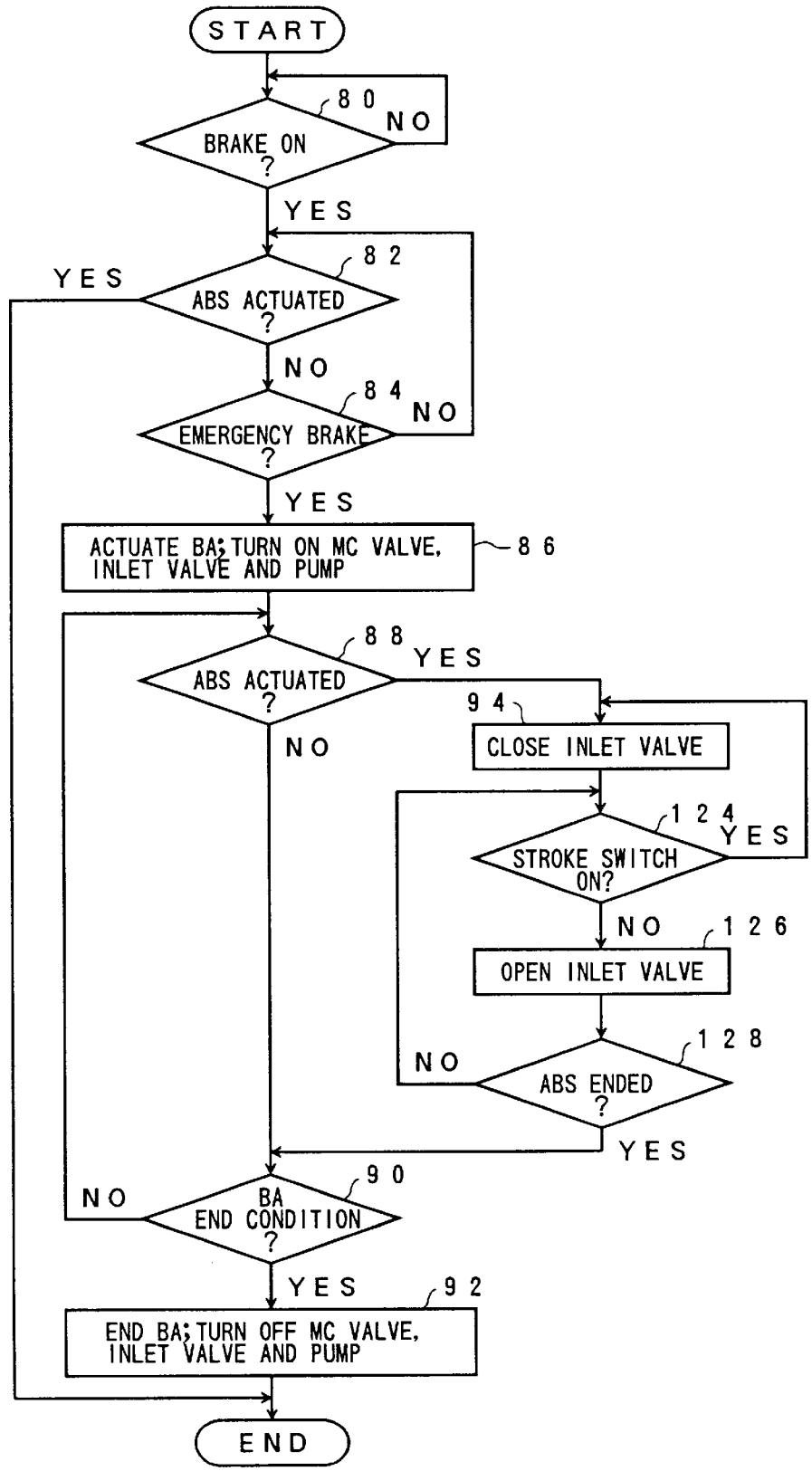
FIG. 8 is a flowchart of a control routine performed in the fourth embodiment of the present invention.

FIG. 8 is a flowchart of a control routine performed by the ECU 10 so as to perform the above-mentioned function. The routine shown in FIG. 8 is a main routine started each time the process thereof is ended. It should be noted that, in FIG. 8, steps that are the same as the steps shown in FIG. 2 are given the same reference numerals, and descriptions thereof will be omitted.

In the present routine, after it is determined, in step 88, that the ABS control is being performed, that is, after it is determined that the BA+ABS control is started in the brake force control apparatus, the inlet valve 78 is closed in step 94 and, then, the process of step 124 is performed.

In step 124, it is determined whether or not the on-signal is output from the stroke switch. As a result, if it is determined that the on-switch is output from the stroke switch, it can be determined that brake fluid is stored in the supplementary reservoir 64. When brake fluid is stored in the supplementary reservoir 64 during the BA+ABS control, it is appropriate to pump out the brake fluid in the supplementary reservoir 64 by the pump 76 so as to prevent the supplementary reservoir 64 from being filled up with brake fluid. Accordingly, if it is determined that the on-signal is output from the stroke switch 122, the process of step 94 is performed again, that is, the process for establishing the condition in which the brake fluid in the supplementary reservoir 64 can be pumped out by the pump 76 is performed again.

On the other hand, if it is determined, in step 124, that the on-switch is not output from the stroke switch 122, it can be determined that brake fluid is not stored in the supplementary reservoir 64. When brake fluid is not stored in the supplementary reservoir 64 during the BA+ABS control, it can be determined that the brake fluid in the high-pressure closed circuit flows out from the relief valve 32 and, as a result, the brake fluid in the high-pressure closed circuit runs short. In this case, in order to prevent the brake fluid pressure $P_B$ in the high-pressure passage 30 from being decreased, it is appropriate to provide brake fluid to the high-pressure closed circuit. If such a determination is made in step 124, the process of step 126 is then performed.

In step 126, a process for opening the inlet valve 78, that is, a process for providing brake fluid to the high-pressure closed circuit from the first fluid pressure circuit 22 is performed.

In step 128, it is determined whether or not a condition (ABS end condition) for ending the ABS control is established. As a result, if it is determined that the ABS end condition is not established, the process of step 124 is performed again. On the other hand, if it is determined that the ABS end condition is established, the process of step 90 is performed next.

According to the above-mentioned process, the process of steps 94 to 128 is repeatedly performed until the ABS end condition is established. As a result, the amount of the brake fluid in the high-pressure closed circuit is controlled to be an appropriate amount without being excessive or short, and the supplementary reservoir 64 is positively prevented from being filled up with brake fluid. Thus, according to the present invention, both the function of the BA control and the function of the ABS control can be achieved when the BA+ABS control is being performed.

It should be noted that, in the above-mentioned embodiment, an "inlet closing means" is achieved by the ECU 10 performing the process of steps 88, 94, 124 and 126.

A description will now be given of a fifth embodiment of the present invention. A brake force control apparatus according to the fifth embodiment of the present invention can be achieved by having the ECU 10 perform a routine shown in FIG. 9 in the system structure shown in FIG. 1. The brake force control apparatus according to the present embodiment has a feature in that the ECU 10 assumes an amount of brake fluid stored in the supplementary reservoir 64, and controls the inlet valve 78 based on the result of the assumption.

In the system structure shown in FIG. 1, an amount Q of brake fluid stored in the supplementary reservoir 64 can be assumed by, for example, a method disclosed in Japanese Laid-Open Patent Application No.8-332935. Specifically, the amount Q of brake fluid can be obtained by subtracting an amount (outflow amount) $Q_{OUT}$ of brake fluid flowing out of the supplementary reservoir 64 from an amount (inflow amount) $Q_{IN}$ of brake fluid flowing into the supplementary reservoir 64.

The inflow amount $Q_{IN}$ can be determined according to a relationship between a depressurizing time $T_{OPEN}$ and a wheel cylinder pressure $P_{W/C}$ when the depressurizing mode is performed. The depressurizing time $T_{OPEN}$ is a period during which the depressurizing valves 58 and 69 are open when the depressurizing mode is performed in each wheel. A two-dimensional map defining the inflow amount $Q_{IN}$ according to the above-mentioned relationship is stored in the ECU 10. Thus, the ECU 10 assumes the inflow amount $Q_{IN}$ in accordance with the depressurizing time $T_{OPEN}$ and the wheel cylinder pressure $P_{W/C}$ by referring to the map.

Additionally, the wheel cylinder pressure of each wheel can be assumed based on a deceleration generated in the vehicle. Further, the deceleration of the vehicle can be calculated based on a wheel speed $V_W$ of each wheel. Accordingly, the inflow amount $Q_{IN}$ can be accurately assumed based on the wheel speed $V_W$ of each wheel and the depressurizing time $T_{OPEN}$.

On the other hand, the outflow amount $Q_{OUT}$ can be assumed based on the capacity of the pump 76 and an accumulated time $T_{TOTAL}$ during which the pump 76 suctions the brake fluid in the supplementary reservoir 64. Accordingly, in the brake force control apparatus according to the present embodiment, the amount Q of the brake fluid stored in the supplementary reservoir 64 can be assumed based on the wheel speed $V_W$ of each wheel, the depressurizing time $T_{OPEN}$, the capacity of the pump 76 and the accumulated time $T_{TOTAL}$.

Figure 9:
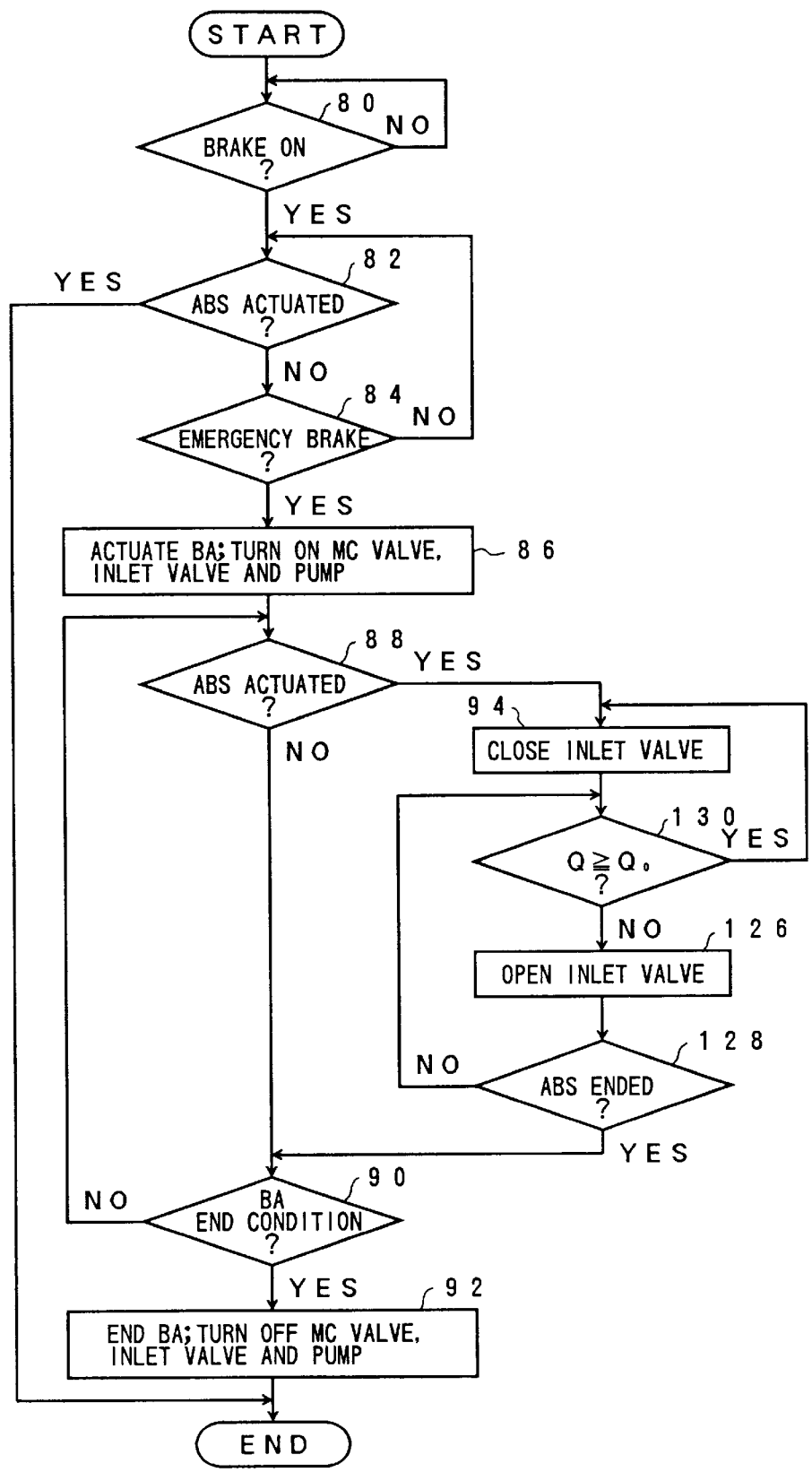
FIG. 9 is a flowchart of a control routine performed in the fifth embodiment of the present invention.

FIG. 9 is a flowchart of an example of a control routine performed by the ECU 10 in the brake force control apparatus according to the present embodiment. The routine shown in FIG. 9 is a main routine started each time the process thereof is completed. It should be noted that, in FIG. 9, steps that are the same as the steps shown in FIG. 8 are given the same reference numerals, and descriptions thereof will be omitted.

In the routine shown in FIG. 9, the process (step 94) for closing the inlet valve 78 is performed after the BA+ABS control is started and, then, the process of step 130 is performed.

In step 130, it is determined whether or not the amount Q of the brake fluid in the supplementary reservoir 64 is greater than a predetermined amount Q0. As a result, if it is determined that $Q \geq Q0$ is established, it can be determined that brake fluid is stored in the supplementary reservoir 64. In this case, in order to prevent the supplementary reservoir 64 from being filled up with the brake fluid, it is necessary to establish the condition in which the brake fluid in the supplementary reservoir 64 can be pumped out by the pump 76. Accordingly, if such a determination is made, the process of step 94 is performed again.

On the other hand, if it is determined, in step 130, that $Q \geq Q0$ is not established, it can be determined that brake fluid is not stored in the supplementary reservoir 64. In this case, in order to prevent an amount of brake fluid in the high-pressure closed circuit from running short, it is appropriate to establish the condition in which brake fluid can be provided to the high-pressure closed circuit. Accordingly, if such a determination is made, the process of step 126, that is, the process for opening the inlet valve 78 is performed.

Similar to the fourth embodiment, according to the above-mentioned process, an amount of brake fluid in the high-pressure closed circuit can be appropriately maintained while preventing the supplementary reservoir 64 from being filled up with brake fluid. Thus, according to the brake force control apparatus of the present embodiment, both the function of the BA control and the function of the ABS control can be appropriately performed when the BA+ABS control is being performed.

It should be noted that, in the above-mentioned embodiment, an "inlet closing means" is achieved by the ECU 10 performing the process of steps 88, 94, 130 and 126.

A description will now be given, with reference to FIGS. 10 and 11, of a sixth embodiment of the present invention.

Figure 10:
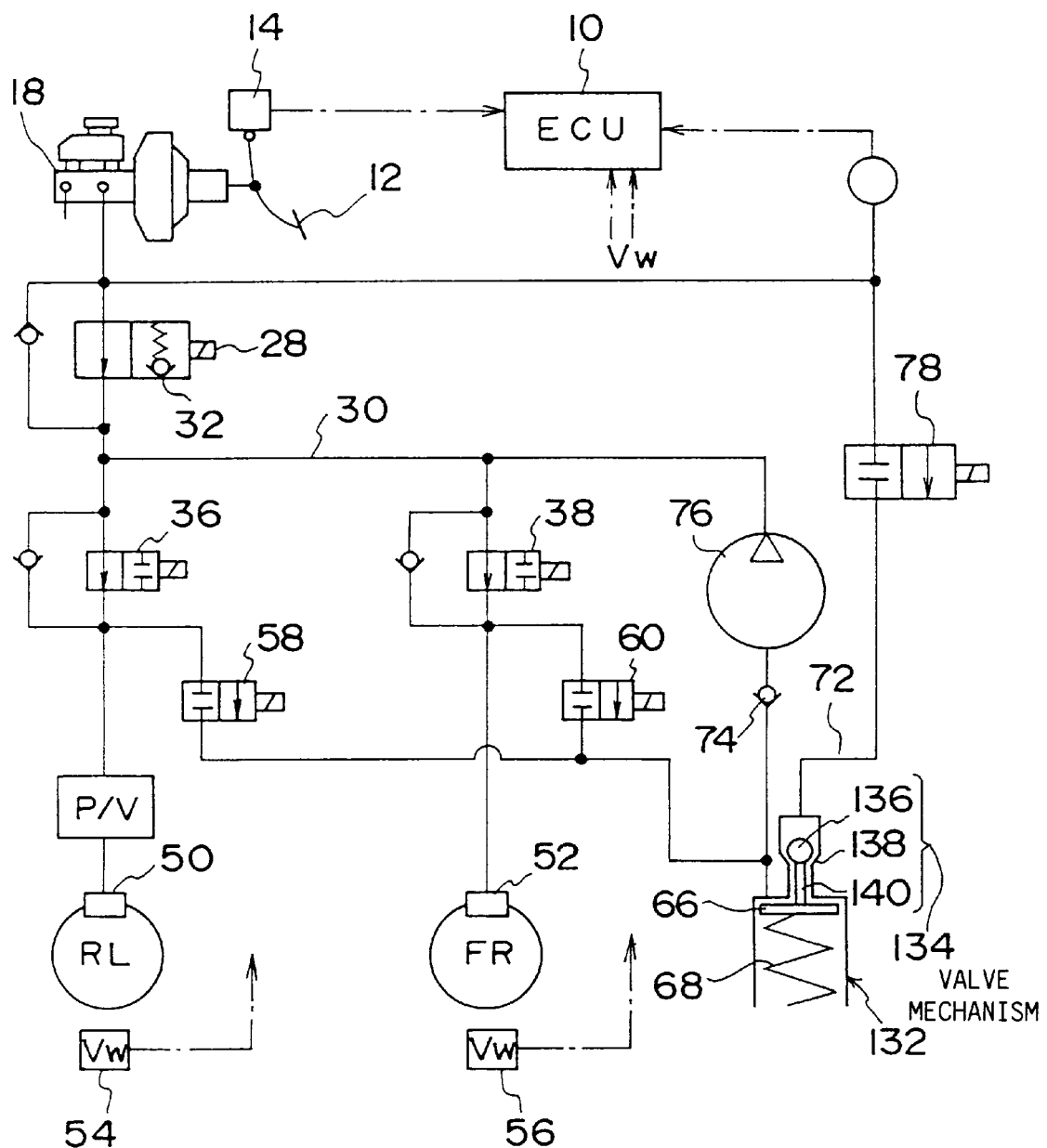
FIG. 10 is a system structure diagram of a brake force control apparatus according to a sixth embodiment of the present invention.

FIG. 10 is a system structure diagram of a brake force control apparatus according to the sixth embodiment of the present invention. The brake force control apparatus according to the sixth embodiment of the present invention can be achieved by having the ECU 10 perform a routine shown in FIG. 11 in the system structure shown in FIG. 10. It should be noted that, in FIG. 10, parts that are the same as the parts shown in FIG. 1 are given the same reference numerals, and descriptions thereof will be omitted.

As shown in FIG. 10, the brake force control apparatus according to the present embodiment comprises a supplementary reservoir 132. The supplementary reservoir 132 has a piston 66 and a spring 68 inside thereof. The supplementary reservoir 132 is connected to the inlet of the pump 76 via the check valve 74.

The supplementary reservoir 132 has a valve mechanism 134. The valve mechanism 134 includes a ball 136, a valve seat 138 and a shaft member 140. The supplementary reservoir 132 is connected to the inlet passage 72 via the valve mechanism 134. The shaft member 140 is interposed between the piston 66 and the ball 136.

The valve mechanism 134 is constituted so that the ball 136 is separated from the valve seat 138 when the piston 66 is positioned at or near the top dead center, and the ball 136 is seated on the valve seat 138 when the piston 66 is displaced with a stroke exceeding a predetermined distance. Accordingly, the supplementary reservoir 132 communicates with the inlet passage 72 when an amount Q of brake fluid stored in the supplementary reservoir 132 is less than a predetermined amount, and the supplementary reservoir 132 is disconnected from the inlet passage 72 when the amount Q of brake fluid exceeds the predetermined amount.

Figure 11:
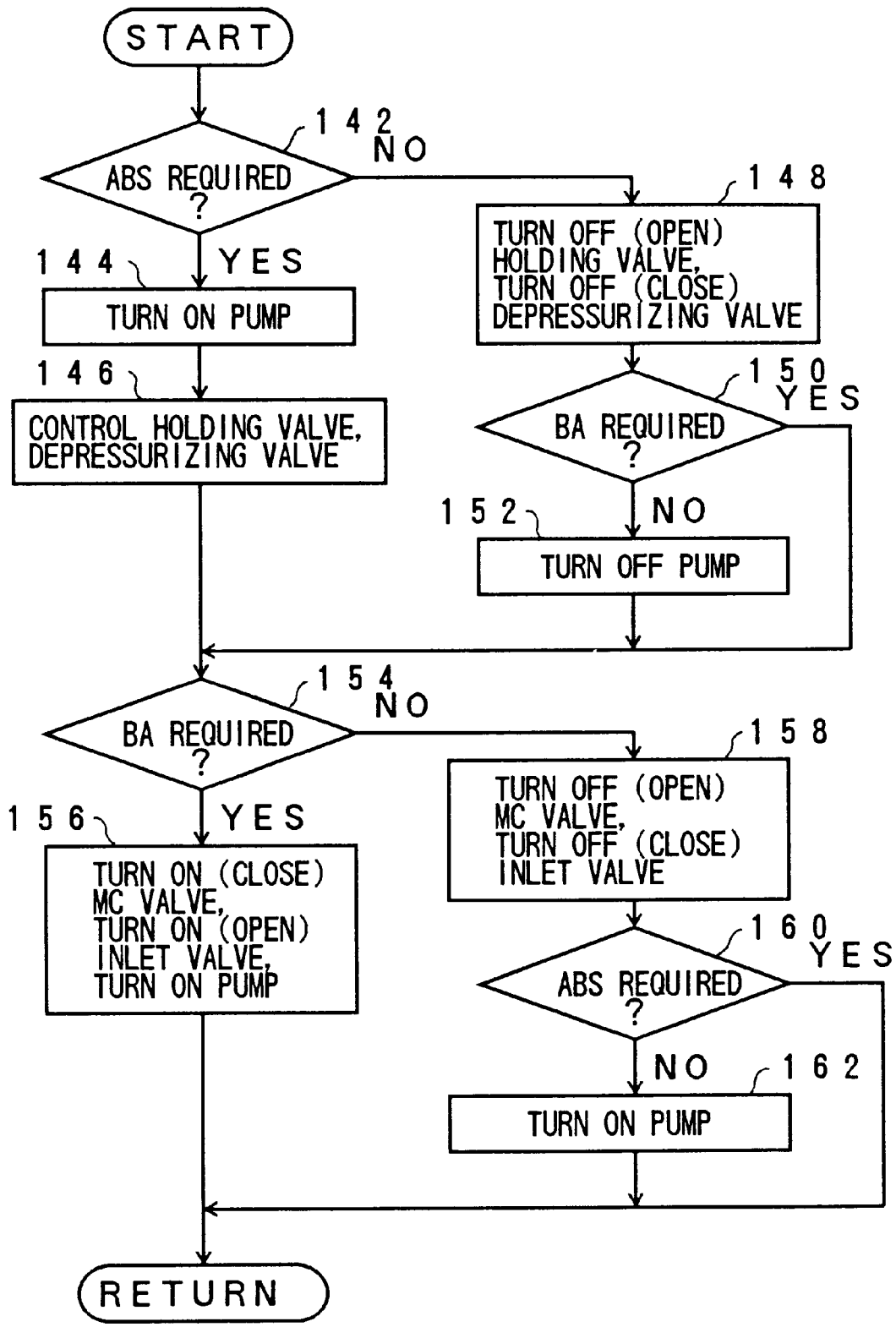
FIG. 11 is a flowchart of a control routine performed in the sixth embodiment.

FIG. 11 is a flowchart of an example of a control routine performed by the ECU 10 so as to achieve the ABS control, the BA control and BA+ABS control. The routine shown in FIG. 11 is a periodic interruption routine which is started at a predetermined time interval. When the routine shown in FIG. 11 is started, the process of step 142 is performed first.

In step 142, it is determined whether or not the ABS control is required. The ABS control is required after a slip rate exceeding the start threshold value is generated in one of the wheels during a brake operation and until the ABS end condition is established. If it is determined, in step 142, that the ABS control is required, the process of step 144 is then performed.

In step 144, a process for turning on the pump 76 is performed. In step 146, the holding valves 36 and 38 and the depressurizing valves 58 and 60 are controlled in response to the requirement for the ABS control. By the process of step 146, the depressurizing mode, the pressurizing mode and the holding mode are performed, if necessary, with respect to the ABS objective wheel. The brake fluid flowing in the supplementary reservoir 132 in relation to execution of the depressurizing mode is pumped out by the pump 76 and is supplied to the high-pressure passage 30. According to the above-mentioned process, when an excessive slip rate is generated in one of the wheels during a brake operation, the function of the ABS control can be appropriately performed.

In the present routine, if it is determined, in step 142, that the ABS control is not required, the process of step 148 is performed.

In step 148, a process for opening the holding valves 36 and 38 (off state) and for closing the depressurizing valves 58 and 60 (off state) is performed.

In step 150, it is determined whether or not the BA control is required. In the present embodiment, the pump 76 is turned on when the BA control is being performed. Accordingly, if it is determined, in step 150, that the BA control is required, it is appropriate to maintain the pump 76 in the on state when the BA control is being performed. In the present routine, in such a case, step 152 is skipped, and the process of step 154 is performed. On the other hand, if it is determined, in step 150, that the BA control is not required, it is appropriate to turn off the pump 76. In this case, the process of step 152 is performed.

In step 152, a process for turning off the pump 76 is performed. According to this process, the ABS control can be ended without hunting an operation of the pump 76 when the ABS control is not required.

In step 154, it is determined whether or not the BA control is required. The BA control is required after an emergency brake operation is required by the driver and until the BA end condition is established. If it is determined, in step 154, that the BA control is required, the process of step 156 is performed next.

In step 156, a process for closing the master cut valve 28 (on state), for opening the inlet valve 78 (on state) and for turning on the pump 76 is performed. After the process of step 156 is performed, the brake fluid in the master cylinder 18 flows to the supplementary reservoir 132 until an amount Q of brake fluid in the supplementary reservoir 132 reaches a predetermined amount. Thereafter, the brake fluid flowing in the supplementary reservoir 132 is delivered to the pump 76. Thereby, the brake fluid pressure $P_B$ which is higher than the master cylinder pressure by the assist pressure Pa is generated in the high-pressure passage 30. After the process of step 156 is completed, the present routine is ended.

According to the above-mentioned process, when an emergency brake operation is performed by the driver, the brake fluid pressure $P_B$ which is higher than the master cylinder pressure by the assist pressure Pa is generated in the high-pressure passage 30. Thus, according to the brake force control apparatus of the present embodiment, the function of the BA control can be appropriately performed.

In the present routine, if it is determined, in step 154, that the BA control is not required, the process of step 158 is performed.

In step 158, a process for opening the master cut valve 28 (off state) and for closing the inlet valve 78 (off state) is performed.

In step 160, it is determined whether or not the ABS control is required. In the present embodiment, when the ABS control is being performed, the pump 76 is turned on. Accordingly, if it is determined, in step 160, that the ABS control is required, it is appropriate to maintain the pump 76 in the on state even though the BA control is not required. In this case, step 162 is skipped, and the present routine is ended. On the other hand, if it is determined, in step 160, that the ABS control is not required, it is appropriate to turn off the pump 76. In this case, the process of step 162 is then performed.

In step 162, a process for turning off the pump 76 is performed. After the process of step 162 is completed, the present routine is ended. According to the above-mentioned process, when the BA control is not required, the BA control can be terminated without hunting an operation of the pump 76.

In the brake force control apparatus according to the present embodiment, if a slip rate exceeding the start threshold value is generated in one of the wheels after the BA control is started, the BA+ABS control is started. When the BA+ABS control is being performed, the process of steps 142 to 146, 154 and 156 is repeatedly performed. In this case, the master cut valve 28, the inlet valve 78 and the pump 76 are maintained in the on state.

When the BA+ABS control is being performed, an amount of brake fluid in the high-pressure closed circuit must be controlled to be an appropriate amount while preventing the supplementary reservoir 132 from being filled up with the brake fluid. Accordingly, if a large amount of brake fluid is stored in the supplementary reservoir 132, it is appropriate to establish the condition in which the brake fluid in the supplementary reservoir 132 can be pumped out by the pump 76. On the other hand, if a small amount of brake fluid is stored in the supplementary reservoir 132, it is appropriate to establish the condition in which brake fluid can be provided to the high-pressure closed circuit.

According to the brake force control apparatus of the present embodiment, when a large amount of brake fluid is stored in the supplementary reservoir 132, the valve mechanism 134 is closed to disconnect the supplementary reservoir 132 from the inlet passage 72. Thus, according to the brake force control apparatus of the present embodiment, when a large amount of brake fluid is stored in the supplementary reservoir 132 during the BA+ABS control, the condition in which the brake fluid can be pumped out by the pump 76 despite the inlet valve 78 is maintained in the open state.

Additionally, in the brake force control apparatus according to the present embodiment, when a small amount of brake fluid is stored in the supplementary reservoir 132, the valve mechanism 134 is opened so as to connect the supplementary reservoir 132 to the inlet passage 72. Thus, according to the brake force control apparatus of the present embodiment, when a small amount of brake fluid is stored in the supplementary reservoir 132 during the BA+ABS control, the condition in which brake fluid can be provided to the high-pressure closed circuit through the inlet passage 72 is established.

As mentioned above, according to the brake force control apparatus of the present embodiment, despite the inlet valve 78 being continuously open during the BA+ABS control, the supplementary reservoir 132 is prevented from being filled up with brake fluid and the condition necessary for maintaining an appropriate amount of brake fluid in the high-pressure closed circuit can be established. Thus, according to the brake force control apparatus of the present embodiment, the function of the BA control and the function of the ABS control can be appropriately performed when the BA+ABS control is being performed.

It should be noted that, in the above-mentioned embodiment, the inlet valve 78 and the valve mechanism 134 correspond to an "inlet control valve" and an "inlet closing means". Additionally, a "brake assist means" is achieved by the ECU 10 performing the process of step 154 and 156, and an "antilock brake means" is achieved by the ECU performing the process of steps 142 to 146.

A description will now be given, with reference to FIGS. 12 and 2, of a seventh embodiment of the present embodiment.

Figure 12:
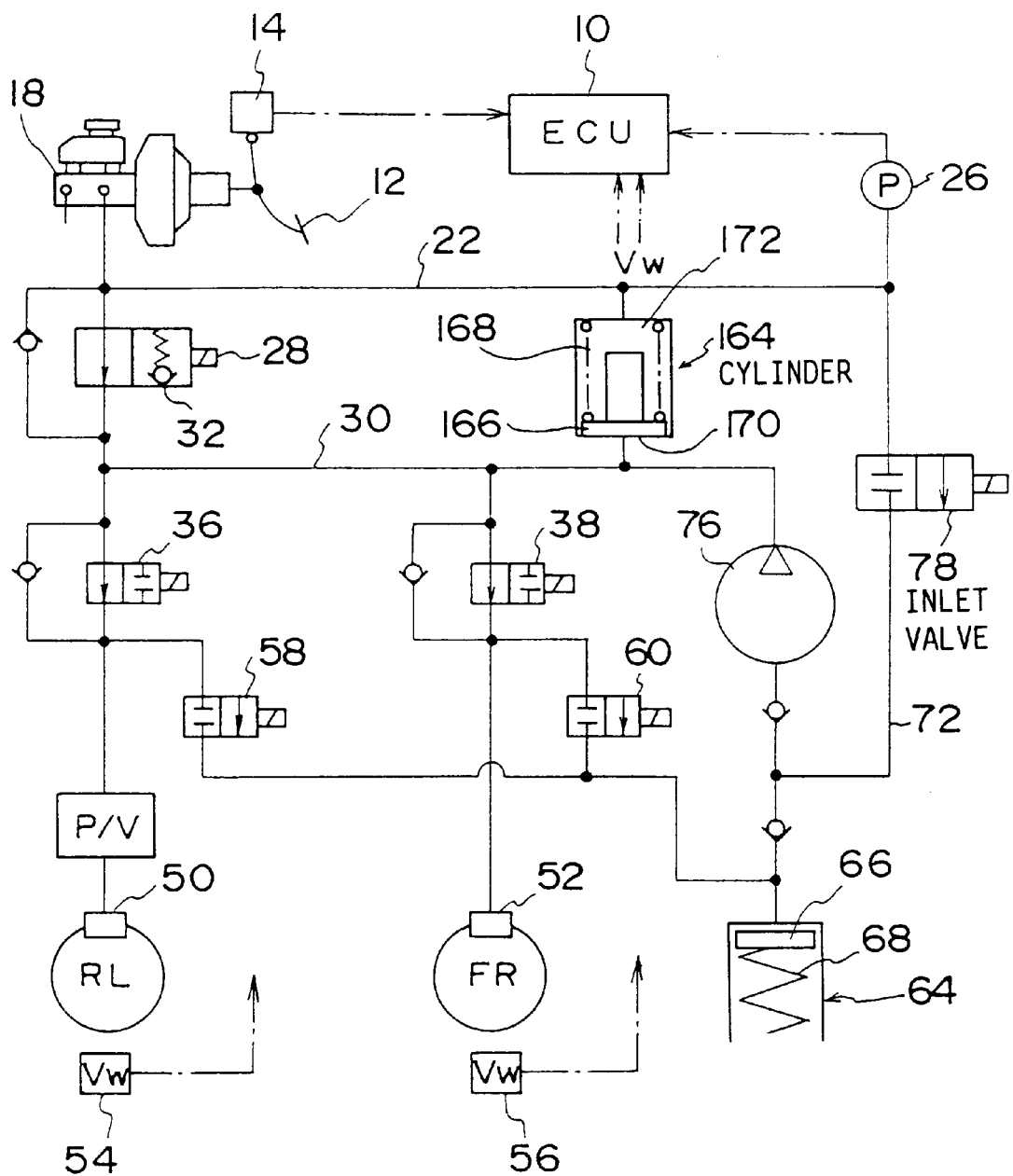
FIG. 12 is a system structure diagram of a brake force control apparatus according to a seventh embodiment of the present invention.

FIG. 12 is a system structure diagram of a part of a brake force control apparatus according to the seventh embodiment of the present invention. The brake force control apparatus according to the present embodiment can be achieved by having the ECU 10 perform a routine shown in FIG. 2 in the system structure shown in FIG. 12. It should be noted that, in FIG. 12, parts that are the same as the parts shown in FIG. 1 are given the same reference numerals, and descriptions thereof will be omitted.

As shown in FIG. 12, the brake force control apparatus according to the present embodiment comprises a cylinder 164. A piston 166 and a spring 168 are provided in the cylinder 164. The piston 166 divides an inner space of the cylinder 164 into a first space 170 connected to the high-pressure passage 30 and a second space 172 connected to the first fluid pressure passage 22.

The spring 168 urges the piston 166 with a predetermined urging force in a direction from the second space 172 to the first space 170. The piston 166 moves in a direction toward the second space 172 when a difference between a pressure in the first space 170 and a pressure in the second space 172 overcomes the urging force of the spring 168. That is, the piston 166 moves in the direction toward the second space 172 when a difference between the brake fluid pressure $P_B$ in the high-pressure passage 30 and the master cylinder pressure overcomes the urging force of the spring 168.

In the present embodiment, the urging force of the spring 168 is set so that the piston 166 starts to move upwardly from the bottom dead center when the brake fluid pressure $P_B$ in the high-pressure passage 30 becomes higher than the master cylinder pressure by a predetermined pressure Pa' which is slightly smaller than the assist pressure Pa. Additionally, the urging force of the spring 168 is set so that the piston 166 reaches the top dead center when the brake fluid pressure $P_B$ in the high-pressure passage 30 becomes higher than the master cylinder pressure by the assist pressure Pa. Thus, according to the cylinder 164, the brake fluid pressure $P_B$ can be stored in the first space 170 when the brake fluid pressure $P_B$ in the high pressure passage 30 is higher than the master cylinder pressure by a pressure exceeding the assist pressure Pa. Additionally, according to the present invention, an amount of brake fluid equal to the maximum volume $V_{MAX}$ of the first space 170 can be stored in the cylinder 164 when the brake fluid pressure $P_B$ in the high-pressure passage 30 is higher than the master cylinder pressure by the assist pressure Pa.

In the present embodiment, the ECU 10 performs the routine shown in FIG. 2. According to the control routine shown in FIG. 2, when an emergency brake operation is performed by the driver, the BA control is started by closing the master cut valve 28 (on state), opening the inlet valve 78 (on state) and turning on the pump 76 (step 86). Thereafter, when the BA+ABS control is started, the process for closing the inlet valve 78 (off state) is performed (step 94) so as to prevent the supplementary reservoir 64 from being filled up with brake fluid.

In the brake force control apparatus according to the present embodiment, when the BA control is started, the brake fluid pressure $P_B$ which is higher that the master cylinder pressure by the assist pressure Pa is generated in the high-pressure passage 30. Accordingly, an amount of brake fluid equal to the maximum volume of the first space 170 is rapidly stored in the cylinder 164 at the brake fluid pressure $P_B$ after the BA control is started.

In the brake force control apparatus according to the present embodiment, after the BA+ABS control is started, it is possible that both the holding valves 36 and 38 are closed. In such a case, the brake fluid discharged from the pump 76 passes through the relief valve 32 and flows to the master cylinder 18. As a result, an amount of brake fluid in the high-pressure closed circuit is reduced.

If the pressurizing mode is required in the ABS objective wheel after the brake fluid in the high-pressure closed circuit is decreased as mentioned above, the holding valves 36 and 38 corresponding to the ABS objective wheel are opened. When the BA+ABS control is being performed, the wheel cylinder pressure of the ABS objective wheel is maintained at a pressure lower than the brake fluid pressure $P_B$ in the high-pressure passage 30. Accordingly, when the holding valves 36 and 38 corresponding to the ABS objective wheel are opened, the brake fluid in the high-pressure passage 30 flows toward the wheel cylinder of the ABS objective wheel.

The brake fluid pressure $P_B$ in the high-pressure passage 30 tends to decrease as the brake fluid in the high-pressure passage 30 flows from the high-pressure passage 30 to the wheel cylinder. In the brake force control apparatus according to the present embodiment, the brake fluid stored in the first space 170 flows to the high-pressure passage 30 when the brake fluid pressure $P_B$ in the high-pressure passage 30 is decreased. When the brake fluid in the first space 170 flows to the high-pressure passage 30, a degree of the decrease in the brake fluid pressure $P_B$ in the high-pressure passage 30 is decreased. Thus, according to the brake force control apparatus of the present embodiment, a degree of decrease in the brake fluid pressure $P_B$ can be decreased when the brake fluid in the high-pressure closed circuit flows out during the BA+ABS control.

In the brake force control apparatus according to the present embodiment, the piston 166 moves in a direction in which the volume of the first space 170 is reduced when brake fluid flows into the high-pressure passage 30 from the first space 170 during the BA+ABS control. If the piston moved in such a direction, the cylinder 164 is set in a state in which the cylinder 164 can suction the brake fluid in the high-pressure passage 30. Accordingly, if both the holding valves 36 and 38 are closed, the brake fluid discharged from the pump 76 does not flow to the master cylinder 18 but is stored in the cylinder 164.

The maximum volume $V_{MAX}$ of the first space 170 is larger than a sum of an amount of brake fluid flowing out of the wheel cylinder 50 during one time execution of the depressurizing mode and an amount of brake fluid flowing out of the wheel cylinder 52 during one time execution of the depressurizing mode. Accordingly, even if the depressurizing mode is set in both the rear left wheel RL and the front right wheel FR at the same time and the whole brake fluid in the supplementary reservoir 64 flows toward the maser cylinder 18, an amount of brake fluid, which is sufficient for returning the wheel cylinder pressure of the rear left wheel RL and the front right wheel FR to a fluid pressure before the depressurizing mode is performed, remains in the high-pressure closed circuit.

Additionally, in the system according to the present embodiment, a fluid pressure which higher than the master cylinder pressure by the predetermined pressure Pa' remains in the first space 170 after most of the brake fluid stored in the first space has flowed out. Accordingly, even if most of the brake fluid in the first space 170 is provided to the wheel cylinders 50 and 52 during the BA+ABS control, the brake fluid pressure $P_B$ higher than the master cylinder pressure by the predetermined pressure Pa' remains in the high-pressure passage 30.

As mentioned above, according to the brake force control apparatus of the present embodiment, a sufficient amount of brake fluid can be maintained in the high-pressure closed circuit during the BA+ABS control, and the brake fluid pressure $P_B$ in the high-pressure passage 30 can be maintained at a pressure higher than the master cylinder pressure by the predetermined pressure Pa'. Thus, according to the brake force control apparatus of the present embodiment, both the function of the BA control and the function of the ABS control can be appropriately performed during the BA+ABS control.

It should be noted that, in the above-mentioned embodiment, the master cut valve 28 corresponds to a "relief means". Additionally, a "first state" is achieved by turning off the master cut valve 28, and a "second state" is achieved by turning on the master cut valve 28. Further, the cylinder 164 corresponds to a "pressure accumulating means", the piston 166 corresponds to a "space dividing member" and the spring 168 corresponds to an "urging member".

The present invention is not limited to the specifically disclosed embodiments, and variations and modifications may be made without departing from the scope of the present invention.

The present invention is based on Japanese priority application No.9-182818 filed on Jul. 8, 1997, entire contents of which are herein incorporated by reference.

What is claimed is:

1. A brake force control apparatus performing a brake assist control and an antilock brake control, the brake assist control being performed, when an emergency brake operation is performed by a driver, for generating a brake fluid pressure higher than a brake fluid pressure generated by a normal brake operation, the antilock brake control being performed for decreasing a wheel cylinder pressure so that an excessive slip rate is not generated by a brake operation, the brake force control apparatus comprising:

a master cylinder generating a brake fluid pressure corresponding to a magnitude of a brake operation;

a pump having an inlet port and an outlet port, said inlet port being communicable with said master cylinder;

an inlet control valve controlling communication between said master cylinder and said inlet port of said pump;

a wheel cylinder communicable with each of said master cylinder and said outlet port of said pump;

a supplementary reservoir communicable with each of said wheel cylinder and said inlet port of said pump;

brake assist means for performing the brake assist control, when the emergency brake operation is performed by the driver, by opening said inlet control valve and actuating said pump;

antilock brake means for performing the antilock brake control by controlling communication between said wheel cylinder and each of said master cylinder, said outlet port of said pump and said supplementary reservoir and actuating said pump; and inlet closing means for closing said inlet control valve when both said brake assist control and said antilock brake control are performed concurrently.

2. The brake force control apparatus as claimed in claim 1, wherein said inlet closing means closes said inlet control valve when an amount of brake fluid stored in said supplementary reservoir exceeds a predetermined amount.

3. The brake force control apparatus as claimed in claim 1, wherein said inlet closing means closes said inlet control valve when said wheel cylinder is communicated with said supplementary reservoir during execution of said antilock brake control.

4. The brake force control apparatus as claimed in claim 1, further comprising:

relief means for selectively establishing a first state and a second state, the first state for communicating said master cylinder with a high-pressure passage connecting said wheel cylinder to said pump, said second state for permitting a flow of brake fluid in a direction from said high-pressure passage to said master cylinder only when a brake fluid pressure in said high-pressure passage is higher than a brake fluid pressure in said master cylinder by a predetermined relief pressure; and accumulating means, communicated with said high-pressure passage, for accumulating the brake fluid pressure in said high-pressure passage.

5. The brake force control apparatus as claimed in claim 4, wherein said accumulating means comprises:

a cylinder communicated with each of said high-pressure passage and said master cylinder;

a space dividing member dividing an inner space of said cylinder into a first space communicating with said high-pressure passage and a second space communicating said master cylinder so that a volume of said first space and a volume of said second space are varied in response to a difference in a pressure in said first space and a pressure in said second space; and an urging member urging said space dividing member with a predetermined urging force in a direction in which the volume of said first space is reduced.

6. The brake force control apparatus as claimed in claim 5, wherein a depressurizing mode, in which said wheel cylinder is communicated with said supplementary reservoir for a predetermined period, is performed during execution of said antilock brake control; and the volume of said first space is maintained to be larger than an amount of brake fluid flowing out of said wheel cylinder each time said depressurizing mode is performed when the pressure in said first space is higher than the pressure in said second space by said relief pressure.

7. The brake force control apparatus as claimed in claim 1, further comprising:

relief means for selectively establishing a first state and a second state, said first state for communicating said master cylinder with a high-pressure passage connecting said wheel cylinder to said pump, said second state for permitting a flow of brake fluid in a direction from said high-pressure passage to said master cylinder only when a brake fluid pressure in said high-pressure passage is higher than a brake fluid pressure in said master cylinder by a predetermined relief pressure; and inlet restarting means for opening said inlet control valve until a slip rate of a wheel to be subjected to said antilock brake control reaches a predetermined start threshold value when the slip rate is decreased below a predetermined end threshold value after both said brake assist control and said antilock brake control have been started and before a termination of said brake assist control is required.

8. The brake force control apparatus as claimed in claim 7, further comprising operation tendency detecting means for detecting a tendency of changes in a magnitude of the brake operation, wherein said inlet restarting means includes a first prohibiting means for prohibiting said inlet control valve from being opened when the tendency of changes indicates a decrease in the magnitude of the brake operation.

9. The brake force control apparatus as claimed in claim 7, further comprising a plurality of wheel cylinders communicable with said supplementary reservoir, wherein said inlet restarting means includes second prohibiting means for prohibiting said inlet control valve from being opened when said supplementary reservoir is communicated with one of said plurality of wheel cylinders.

10. The brake force control apparatus as claimed in claim 1, wherein a plurality of wheels are provided in the same brake fluid pressure system of said vehicle, each of said plurality of wheels being individually subjected to the antilock brake control; and said inlet closing means includes opening means for opening said inlet control valve when a wheel cylinder pressure of one of said wheels which is being subjected to the antilock brake control is not being decreased.

11. The brake force control apparatus as claimed in claim 10, wherein said opening means opens said inlet control valve when a magnitude of the brake operation is being increased.

* * * * *